United States Patent
Masuda et al.

(10) Patent No.: US 10,048,808 B2
(45) Date of Patent: Aug. 14, 2018

(54) INPUT OPERATION DETECTION DEVICE, PROJECTION APPARATUS, INTERACTIVE WHITEBOARD, DIGITAL SIGNAGE, AND PROJECTION SYSTEM

(71) Applicants: Koji Masuda, Kanagawa (JP); Yasuhiro Nihei, Kanagawa (JP); Takeshi Ueda, Tokyo (JP); Masahiro Itoh, Kanagawa (JP); Shu Takahashi, Kanagawa (JP); Takeshi Ogawa, Kanagawa (JP); Hiroaki Tanaka, Kanagawa (JP); Shiori Ohta, Kanagawa (JP)

(72) Inventors: Koji Masuda, Kanagawa (JP); Yasuhiro Nihei, Kanagawa (JP); Takeshi Ueda, Tokyo (JP); Masahiro Itoh, Kanagawa (JP); Shu Takahashi, Kanagawa (JP); Takeshi Ogawa, Kanagawa (JP); Hiroaki Tanaka, Kanagawa (JP); Shiori Ohta, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/940,484

(22) Filed: Nov. 13, 2015

(65) Prior Publication Data
US 2016/0170564 A1 Jun. 16, 2016

(30) Foreign Application Priority Data
Dec. 11, 2014 (JP) .................................. 2014-250479

(51) Int. Cl.
G06F 3/042 (2006.01)
G06F 3/00 (2006.01)
(Continued)

(52) U.S. Cl.
CPC ............ G06F 3/0425 (2013.01); G06F 3/005 (2013.01); G06F 3/0304 (2013.01);
(Continued)

(58) Field of Classification Search
CPC ...... G06F 3/0421; G06F 3/042; G06F 3/0425; G06F 3/041
See application file for complete search history.

(56) References Cited

U.S. PATENT DOCUMENTS 7,307,661 B2 * 12/2007 Lieberman ............ G06F 1/1626
345/158
9,465,484 B1 * 10/2016 Kamarshi ............... G06F 3/042
(Continued)

FOREIGN PATENT DOCUMENTS

| CN | 103002239 A | 3/2013 |
| CN | 104035555 A | 9/2014 |

(Continued)

OTHER PUBLICATIONS

Extended European Search Report dated Apr. 25, 2016 in Patent Application No. 15195020.1.
(Continued)

Primary Examiner — Olga Merkoulova
(74) Attorney, Agent, or Firm — Oblon, McClelland, Maier & Neustadt, L.L.P.

(57) ABSTRACT

An input operation detection device to detect input operation input to an image includes a first and second imaging parts and a processor to detect input operation based on data acquired by the first and second imaging parts. The image is divided into first and second images. The optical axes of imaging optical systems of the first and second imaging parts intersect with the image at points on the same side as installation position sides of the corresponding imaging parts with respect to the center of the corresponding images.

16 Claims, 38 Drawing Sheets

(51) Int. Cl.
*G06F 3/03* (2006.01)
*H04N 9/31* (2006.01)
*H04N 13/02* (2006.01)
*H04N 13/00* (2018.01)

(52) U.S. Cl.
CPC ......... *H04N 9/3179* (2013.01); *H04N 9/3194* (2013.01); *H04N 13/0253* (2013.01); *H04N 13/0271* (2013.01); *G06T 2207/10028* (2013.01); *H04N 13/0239* (2013.01); *H04N 2013/0081* (2013.01)

(56) References Cited

U.S. PATENT DOCUMENTS

| | | | |
|---|---|---|---|
| 2002/0021287 A1* | 2/2002 | Tomasi | G06F 1/1613 345/168 |
| 2002/0130944 A1 | 9/2002 | Ema et al. | |
| 2003/0025785 A1 | 2/2003 | Nihei et al. | |
| 2003/0151773 A1 | 8/2003 | Ogawa et al. | |
| 2003/0169455 A1 | 9/2003 | Takahashi et al. | |
| 2004/0160509 A1 | 8/2004 | Nihei et al. | |
| 2004/0183891 A1 | 9/2004 | Ishida et al. | |
| 2005/0213623 A1 | 9/2005 | Ozasa et al. | |
| 2005/0219628 A1 | 10/2005 | Yasutomi et al. | |
| 2007/0030548 A1 | 2/2007 | Nihei et al. | |
| 2008/0218724 A1 | 9/2008 | Nishina et al. | |
| 2008/0225312 A1 | 9/2008 | Ogawa | |
| 2008/0278779 A1 | 11/2008 | Nishina et al. | |
| 2009/0073495 A1 | 3/2009 | Ogawa | |
| 2009/0213440 A1 | 8/2009 | Nishina et al. | |
| 2009/0322891 A1* | 12/2009 | Kondo | G06T 3/4038 348/218.1 |
| 2009/0323139 A1 | 12/2009 | Itoh et al. | |
| 2010/0007929 A1 | 1/2010 | Ono et al. | |
| 2010/0020367 A1 | 1/2010 | Abe et al. | |
| 2010/0027079 A1 | 2/2010 | Nishina et al. | |
| 2010/0046017 A1 | 2/2010 | Ogawa | |
| 2010/0129004 A1 | 5/2010 | Ogawa | |
| 2010/0295783 A1* | 11/2010 | El Dokor | G06F 3/017 345/158 |
| 2012/0075427 A1 | 3/2012 | Yahav et al. | |
| 2012/0099165 A1 | 4/2012 | Omori et al. | |
| 2013/0063401 A1* | 3/2013 | Ouchida | H04N 9/3179 345/175 |
| 2014/0118485 A1* | 5/2014 | Luo | B60R 1/00 348/36 |
| 2014/0253511 A1 | 9/2014 | Yagishita | |
| 2014/0347485 A1* | 11/2014 | Zhang | B60R 11/04 348/148 |
| 2015/0049063 A1* | 2/2015 | Smith | G06F 3/0421 345/175 |
| 2015/0221093 A1* | 8/2015 | Sagawa | G06T 7/0057 345/419 |
| 2015/0301690 A1* | 10/2015 | Masuda | G06F 3/0425 345/175 |

FOREIGN PATENT DOCUMENTS

| | | |
|---|---|---|
| DE | 10 2011 119 082 A1 | 5/2013 |
| GB | 2477044 A | 7/2011 |
| JP | 2002-278700 | 9/2002 |
| JP | 2013-61552 | 4/2013 |

OTHER PUBLICATIONS

Communication dated Feb. 28, 2017 in European Patent Application No. 15195020.1.

Office Action dated Feb. 11, 2018, in corresponding Chinese Patent Application No. 2015109190044 (with English-translation), citing documents AO and AP therein, 12 pages.

* cited by examiner

FIG.20

(COMPARATIVE EXAMPLE)

| POINT | X COORDINATE | Y COORDINATE | Z COORDINATE |
|---|---|---|---|
| O | 0.0 | 0.0 | 0.0 |
| A | 0.0 | 400.0 | 518.6 |
| B | 0.0 | 400.0 | 145.0 |
| C | 0.0 | 400.0 | 892.2 |
| D | 664.1 | 400.0 | 518.5 |
| E | 664.1 | 400.0 | 145.0 |
| F | 664.1 | 400.0 | 892.2 |
| G | 332.1 | 400.0 | 518.6 |
| H | 332.1 | 400.0 | 145.0 |
| I | 332.1 | 400.0 | 892.2 |

| ANGLE | ANGLE (°) |
|---|---|
| ∠GOB | −41.17 |
| ∠GOC | 29.86 |
| ∠GOE | −38.11 |
| ∠GOF | 13.71 |

(UNIT:mm)

FIG.21

(SPECIFIC EXAMPLE 1)

| POINT | X COORDINATE | Y COORDINATE | Z COORDINATE |
|---|---|---|---|
| O | 0.0 | 0.0 | 0.0 |
| A | 0.0 | 400.0 | 518.6 |
| B | 0.0 | 400.0 | 145.0 |
| C | 0.0 | 400.0 | 892.2 |
| D | 664.1 | 400.0 | 518.6 |
| E | 664.1 | 400.0 | 145.0 |
| F | 664.1 | 400.0 | 892.2 |
| G | 332.1 | 400.0 | 518.6 |
| H | 332.1 | 400.0 | 145.0 |
| I | 332.1 | 400.0 | 892.2 |
| J | 274.0 | 400.0 | 371.5 |
| Jx | 274.0 | 400.0 | 518.6 |
| Jz | 0.0 | 400.0 | 371.5 |

(UNIT: mm)

| ANGLE | ANGLE (°) |
|---|---|
| ∠JOB | −34.62 |
| ∠JOC | 34.62 |
| ∠JOE | −34.76 |
| ∠JOF | 21.13 |

FIG.23

(SPECIFIC EXAMPLE 2)

| POINT | X COORDINATE | Y COORDINATE | Z COORDINATE |
|---|---|---|---|
| O | 0.0 | 0.0 | 0.0 |
| A | 0.0 | 400.0 | 518.6 |
| B | 0.0 | 400.0 | 145.0 |
| C | 0.0 | 400.0 | 892.2 |
| D | 664.1 | 400.0 | 518.6 |
| E | 664.1 | 400.0 | 145.0 |
| F | 664.1 | 400.0 | 892.2 |
| G | 332.1 | 400.0 | 518.6 |
| H | 332.1 | 400.0 | 145.0 |
| I | 332.1 | 400.0 | 8922 |
| J | 260.3 | 400.0 | 391.7 |
| Jx1 | 260.3 | 400.0 | 145.0 |
| Jx2 | 260.3 | 400.0 | 892.2 |
| Jz1 | 0.0 | 400.0 | 391.7 |
| Jz2 | 664.1 | 400.0 | 391.7 |

(UNIT:mm)

| ANGLE | ANGLE(°) |
|---|---|
| ∠JOB | −34.38 |
| ∠JOC | 32.44 |
| ∠JOE | −36.85 |
| ∠JOF | 20.77 |
| ∠Jx1OJ | −22.478 |
| ∠Jx2OJ | 22.478 |
| ∠Jz1OJ | −24.935 |
| ∠Jz2OJ | 24.935 |

FIG.27

(COMPARATIVE EXAMPLE)

| S2 | S1 | S0 | |
|---|---|---|---|
| 0.000 | 0.000 | 0.000 | G' |
| 0.507 | −0.712 | 0.000 | B' |
| 0.507 | 0.269 | 0.000 | C' |
| −0.693 | −0.368 | 0.000 | E' |
| −0.141 | 0.199 | 0.000 | F' |

(UNIT: mm)

| | S2 | S1 |
|---|---|---|
| max | 0.507 | 0.269 |
| min | −0.693 | −0.712 |
| width | 1.200 | 0.981 |

(UNIT: mm)

FIG.29

(SPECIFIC EXAMPLE 1)

| S2 | S1 | S0 | |
|---|---|---|---|
| 0.000 | 0.000 | 0.000 | J' |
| 0.502 | -0.474 | 0.000 | B' |
| 0.502 | 0.474 | 0.000 | C' |
| -0.645 | -0.256 | 0.000 | E' |
| -0.172 | 0.346 | 0.000 | F' |

(UNIT: mm)

| | S2 | S1 |
|---|---|---|
| max | 0.502 | 0.474 |
| min | -0.645 | -0.474 |
| width | 1.147 | 0.948 |

(UNIT: mm)

(SPECIFIC EXAMPLE 2)

FIG.32

(SPECIFIC EXAMPLE 2)

| S2 | S1 | S0 | |
|---|---|---|---|
| 0.000 | 0.000 | 0.000 | J' |
| 0.571 | −0.488 | 0.000 | B' |
| 0.571 | 0.488 | 0.000 | C' |
| −0.571 | −0.248 | 0.000 | E' |
| −0.117 | 0.343 | 0.000 | F' |

(UNIT: mm)

| | S2 | S1 |
|---|---|---|
| max | 0.571 | 0.488 |
| min | −0.571 | −0.488 |
| width | 1.142 | 0.976 |

(UNIT: mm)

INPUT OPERATION DETECTION DEVICE, PROJECTION APPARATUS, INTERACTIVE WHITEBOARD, DIGITAL SIGNAGE, AND PROJECTION SYSTEM

CROSS-REFERENCE TO RELATED APPLICATION

The present application is based on and claims priority to Japanese patent application No. 2014-250479, filed Dec. 11, 2014, the disclosure of which is hereby incorporated by reference herein in its entirety.

BACKGROUND

Technical Field

The present invention relates to an input operation detection device, a projection apparatus, an interactive whiteboard, a digital signage, and a projection system. Particularly, the invention relates to an input operation detection device adapted to detect an input operation input by a user, a projection apparatus including the input operation detection device, an interactive whiteboard including the same, a digital signage including the same, and a projection system including the projection apparatus.

Description of Related Art

Interactive projection apparatuses have commercially been available. This kind of projection apparatuses has functions to allow its user to input letters and drawings on an image projected on a screen, to enlarge and reduce the size of the projected image, to turn pages, or the like.

In these functions, user's fingers, or a pen or a stick held by the user can be used as the inputting means to touch the screen, and the projection apparatus detects the position and movement of the inputting means and sends the detection results to, for instance, a computer.

That is, apparatuses having the above interactive functions include an input operation detection device to detect input operations input by the user.

For instance, Patent Literature 1 (Japanese Laid-Open patent application No. 2013-61552) discloses a projection apparatus including projecting means to project a projection image on a projection surface, imaging means to capture an image of an imaging area including the projection surface by a plurality of image sensors, distance acquisition means to acquire distance data representing a distance to an imaging target present in the imaging area based on the images obtained by the plurality of the image sensors, input part detection means to define the imaging target present within an predetermined range from the projection surface based on the acquired distance data and to detect the imaging target as an input part, and analyzing means to analyze input operation input to the projected image in accordance with the positions and/or movements of the input part on the projected image.

SUMMARY

However, it is difficult to reduce the cost without reducing detection accuracy in the above input operation detection devices.

An aspect of the present invention provides an input operation detection device that includes a first imaging section that includes a first imaging optical system and a first image sensor, a second imaging section that includes a second imaging optical system and a second image sensor, and a processor that is configured to detect the input operation based on projection data acquired by the first imaging section and the second imaging section. The image is divided into a first image and a second image with respect to a first direction. The first imaging section is configured to capture the first image and the second imaging section is configured to capture the second image. An optical axis of the first imaging optical system intersects with the image at an intersection point on a same side as an installation position side of the first imaging section with respect to a center of the first image, and an optical axis of the second imaging optical system intersects with the image at an intersection point on a same side as an installation position side of the second imaging section with respect to a center of the second image.

BRIEF DESCRIPTION OF DRAWINGS

FIG. 20 is an explanatory view for explaining numerical values of the comparative example;

FIG. 21 is an explanatory view for explaining numerical values of the first specific example of the embodiment;

FIG. 23 is an explanatory view for explaining numerical values of the second specific example of the embodiment;

FIG. 27 is an explanatory view for explaining numerical values of a photographed image in the comparative example;

FIG. 29 is an explanatory view for explaining numerical values of a photographed image in the first specific example;

FIG. 32 is an explanatory view for explaining numerical values of a photographed image in the second specific example;

DETAILED DESCRIPTION

Figure 1:
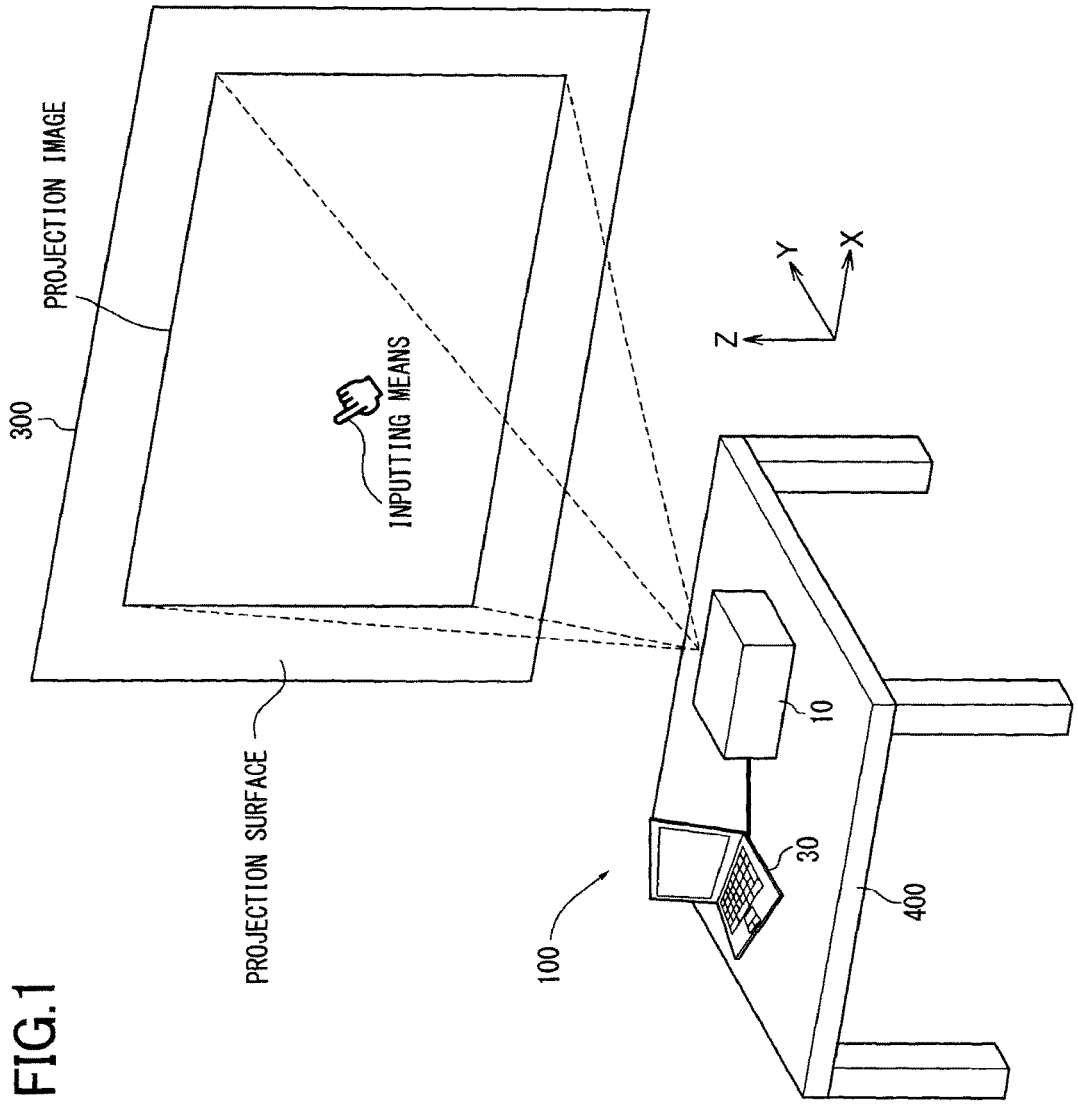
FIG. 1 is a schematic view illustrating a general configuration of the projection system according to an embodiment of the present invention.

Hereinafter, an embodiment of the present invention will be described with reference to FIGS. 1 to 32. FIG. 1 illustrates a schematic configuration of a projection system 100 according to the embodiment.

The projection system 100 includes a projection apparatus 10 and an image management device 30. A user of the projection system 100 touches a projection surface of a screen 300 by an inputting means such as his/her finger, a pen and/or a pointing stick so as to input information into an image projected on the projection surface (hereinafter, also called a "projection image").

The projection apparatus 10 and the image management device 30 are placed on, for example, a desk, a table, or a dedicated pedestal (hereinafter, called "pedestal 400"). Here, a direction orthogonal to the surface of the pedestal 400 is defined as the Z axis direction. The screen 300 is disposed at a position in the +Y axis direction with respect to the projection apparatus 10. A surface on the −Y axis direction side of the screen 300 is defined as the projection surface. Note that the projection surface may be a board surface of a whiteboard, a wall surface, or the like.

The image management device 30 stores a plurality of image data and sends the image data of an imaging target (hereinafter, also called "projection image data") to the projection apparatus 10 in response to a command input by the user. The image management device 30 and the projection apparatus 10 communicate with each other by a cable such as a Universal Serial Bus (USB) cable or by wireless communication. As for the image management device 30, a personal computer installed with a preset program may be used.

When the image management device 30 has an interface for a detachable recording medium such as a USB flash drive and an SD card, the image management device 30 can project images stored in the recording medium as projection images.

Figure 2:
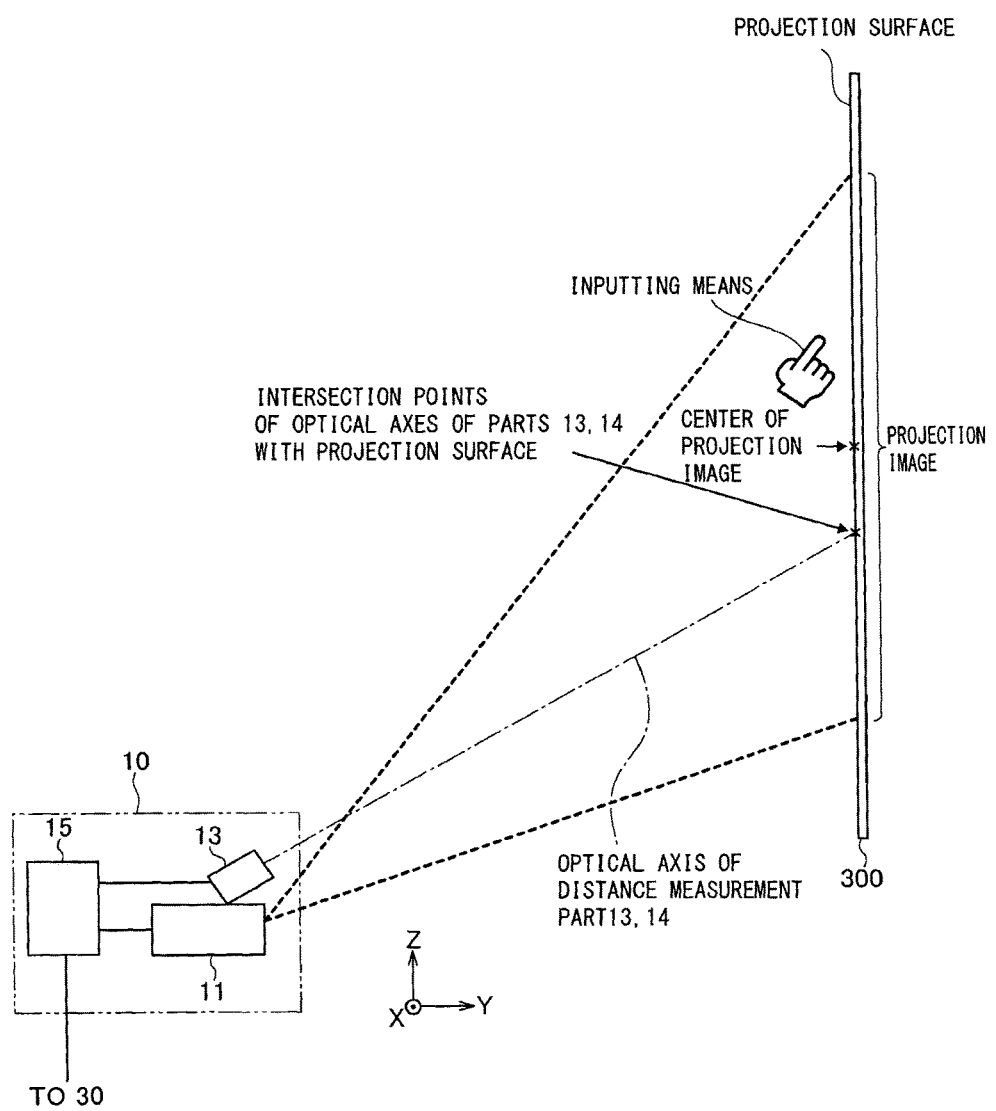
FIG. 2 is a first explanatory view for explaining a projection apparatus.
Figure 3:
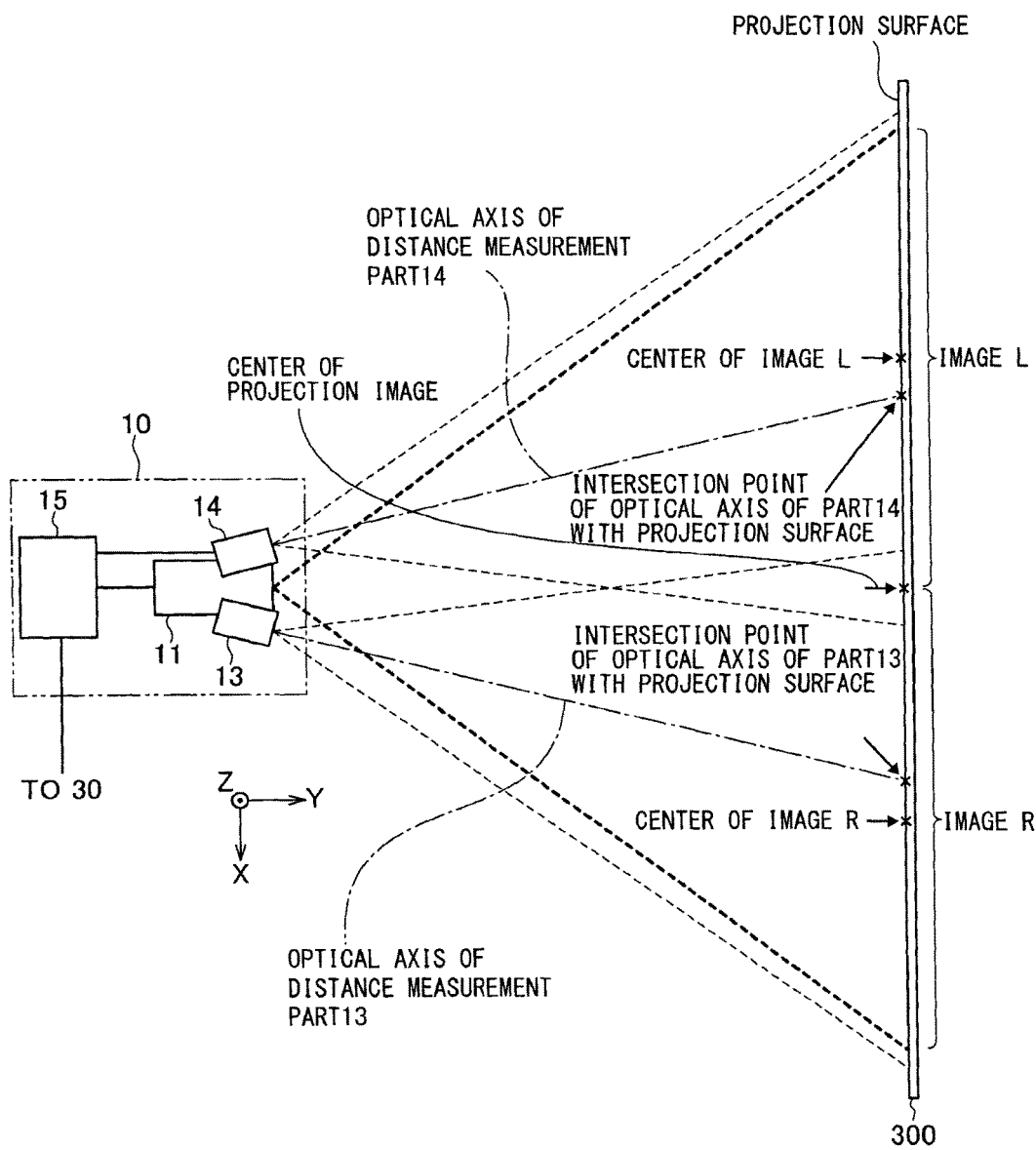
FIG. 3 is a second explanatory view for explaining the projection apparatus.

The projection apparatus 10 is a so-called interactive projection apparatus. The projection apparatus 10 is disposed at a position in −Z axis direction with respect to the center of the projection image (see FIG. 2). As illustrated in FIGS. 2, 3, the projection apparatus 10 includes, for example, a projection part 11, two distance measurement parts (13, 14), and a processor 15. These parts are accommodated in a housing case (not illustrated).

Similarly to a conventional projection apparatus, the projection part 11 includes a light source, a color filter, optical elements, and the like; and is controlled by the processor 15.

The processor 15 performs bidirectional communication with the image management device 30. Upon receiving projection image data, the processor 15 executes a preprogrammed process on the data and projects the processed image on the screen 300 via the projection part 11.

Figure 4:
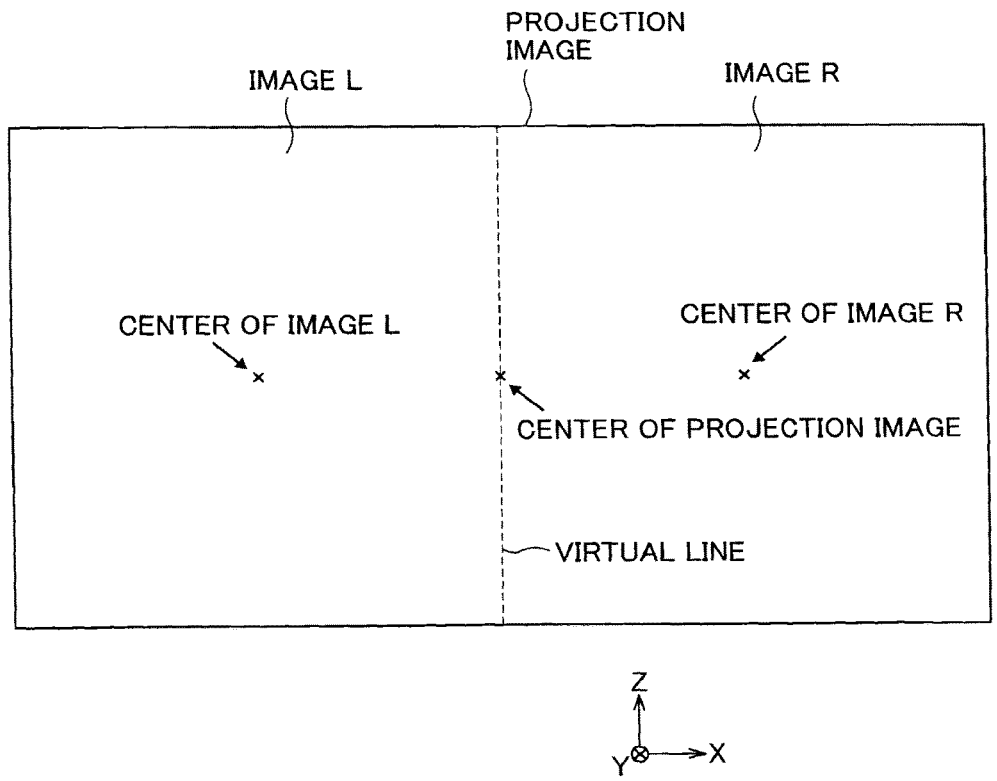
FIG. 4 is an explanatory view for explaining images R and L.

As illustrated in FIG. 4, the projection image is divided into two images by a virtual line that passes the center of the projection image and is in parallel to the Z axis (i.e., divided into two images with respect to the Z axis direction). The image on the +X axis side is defined as "image R" and the image on the −X axis side is defined as "image L".

The first distance measurement part 13 is disposed on −Z axis side and −X axis side from the center of the image R. The second distance measurement part is disposed on −Z axis side and +X axis side from the center of the image L.

Figure 5:
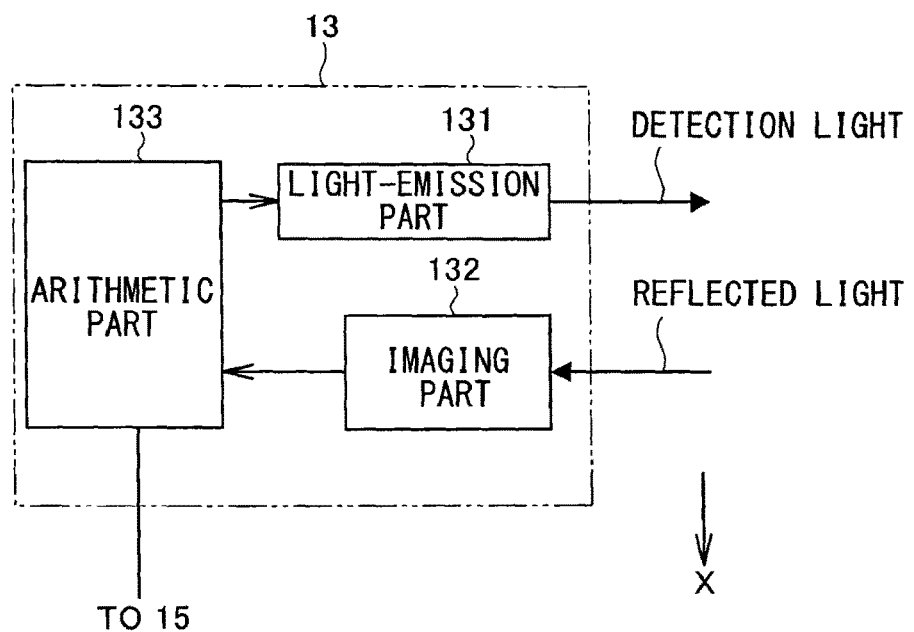
FIG. 5 is an explanatory view for explaining a first distance measurement part.
Figure 6:
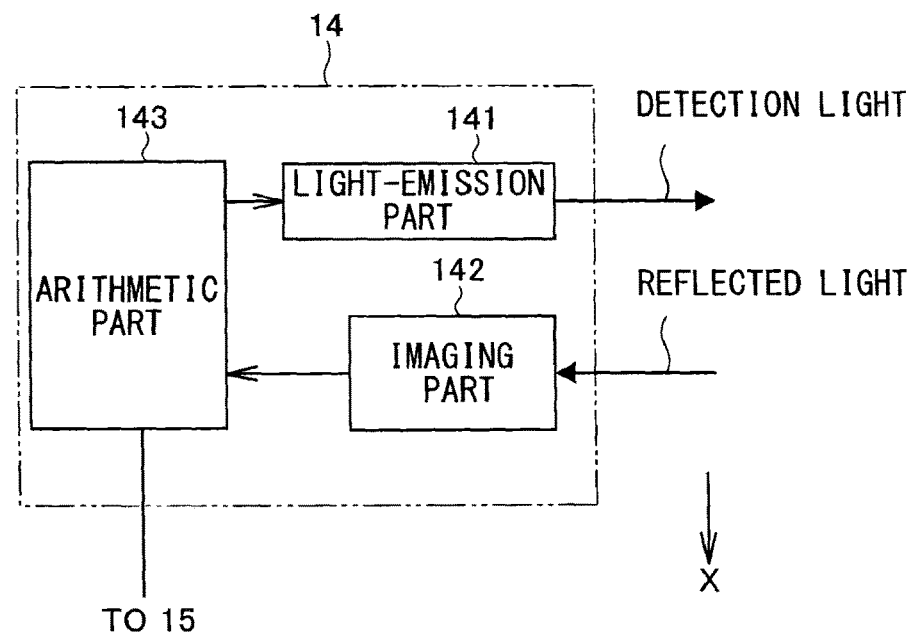
FIG. 6 is an explanatory view for explaining a second distance measurement part.
Figure 7:
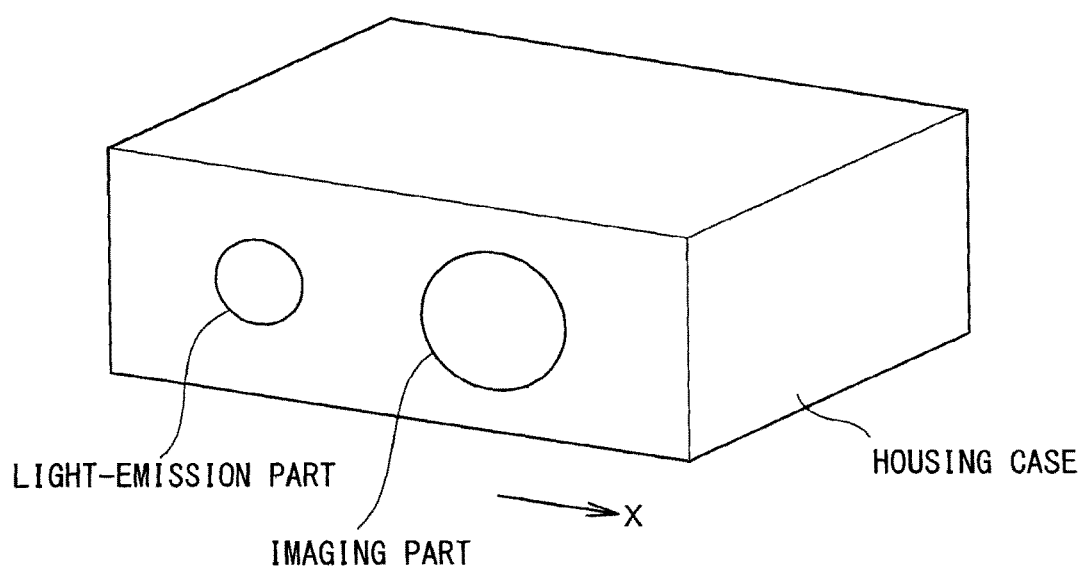
FIG. 7 is an explanatory view for explaining an appearance of the distance measurement part.

The first distance measurement part 13, as illustrated in FIG. 5 as an example, includes a first light-emission part 131, a first imaging part 132, and a first arithmetic part 133. The second distance measurement part 14, as illustrated in FIG. 6 as an example, includes a second light-emission part 141, a second imaging part 142, and a second arithmetic part 143. The appearance of the distance measurement parts (13, 14) is illustrated in FIG. 7 as an example. Note that the light-emission parts 131, 141, imaging parts 132, 142, and arithmetic parts 133, 143 are respectively accommodated in a housing case.

Each of the light-emission parts 131, 141 includes a light source for emitting near infrared light. The light sources are lighted on/off by the processor 15. The light sources may be configured by LEDs or laser diodes (LDs). Further, the light-emission parts may each includes an optical element or a filter to adjust the light emitted from the light source. By including the optical element or the filter, the light-emission part can adjust the emission direction (angle) of detection light or modify the detection light into structured light (see FIG. 34), into modulated light (see FIG. 35), into light imparting texture to the imaging target (see FIG. 36), or the like.

The first light-emission part 131 emits light (detection light) to the image R, while the second light-emission part 141 emits light (detection light) to the image L.

Figure 8:
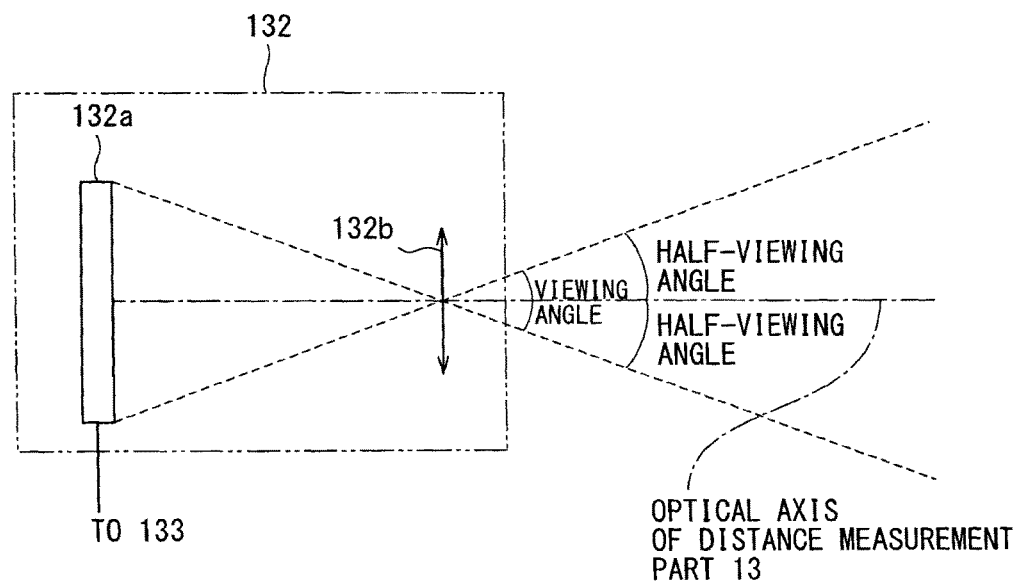
FIG. 8 is an explanatory view for explaining an imaging part of the first distance measurement part.

The first imaging part 132 captures the light that has been emitted from the first light-emission part 131 and reflected by the imaging target. The first imaging part 132, as illustrated in FIG. 8 as an example, includes a first image sensor 132a and a first imaging optical system 132b. The first image sensor 132a is configured to be an area image sensor and have a rectangular shape. The first imaging optical system 132b leads the light that has been emitted from the first light-emission part 131 and reflected by the imaging target into the first image sensor 132a. Since the first image sensor 132a is configured to be the area image sensor, the first image sensor 132a can collectively acquire two-dimensional data without using light deflection means such as a polygon mirror.

Figure 9:
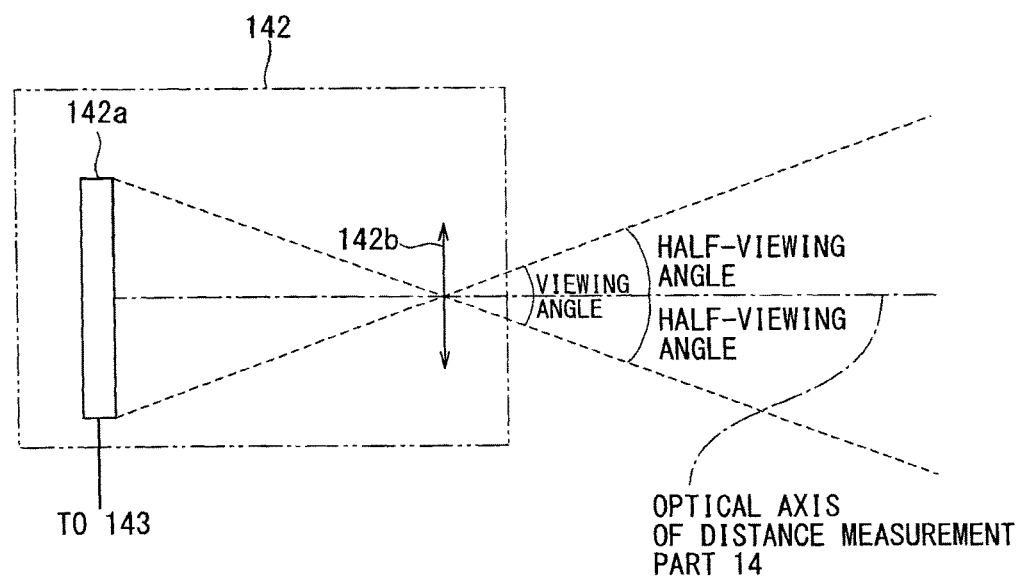
FIG. 9 is an explanatory view for explaining an imaging part of the second distance measurement part.
Figure 10:
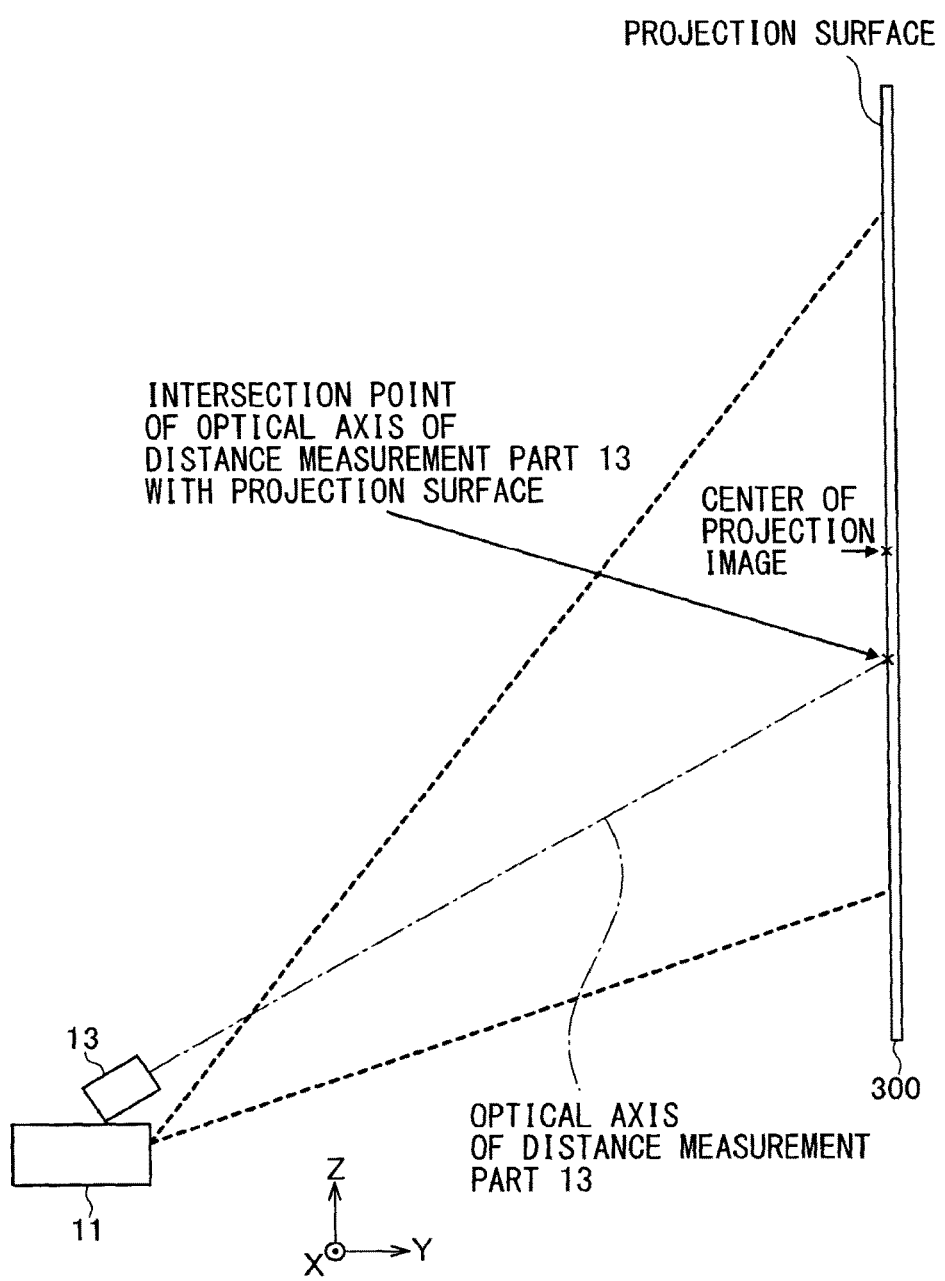
FIG. 10 is a first explanatory view for explaining the first distance measurement part and a projection image.

The second imaging part 142 captures the light that has been emitted from the second light-emission part 141 and reflected by the imaging target. The second imaging part 142, as illustrated in FIG. 9 as an example, includes a second image sensor 142a and a second imaging optical system 142b. The second image sensor 142a is configured to be an area image sensor and have a rectangular shape. The second imaging optical system 142b leads the light that has been emitted from the second light-emission part 141 and reflected by the imaging target into the second image sensor 142a. Since the second image sensor 142a is configured to be the area image sensor, the second image sensor 142a can collectively acquire two-dimensional data without using light deflection means such as a polygon mirror.

The field angle of the first imaging optical system 132b is defined so as to allow the first imaging optical system 132b to capture the entire area of the image R. The field angle of the second imaging optical system 142b is defined so as to allow the second imaging optical system 142b to capture the entire area of the image L. Accordingly, the entire area of the projection image is captured by the first imaging optical system 132b and the second imaging optical system 142b.

Here, the imaging target may be the projection surface on which the projection image is not projected, the projection image projected on the projection surface, or the projection image together with the inputting means.

The imaging optical systems configure a so-called coaxial optical system. Hereinafter, the optical axis of the first imaging optical system 132b is also called an "optical axis of the first distance measurement part 13" and the optical axis of the second imaging optical system 142b is also called an "optical axis of the second distance measurement part 14."

Figure 11:
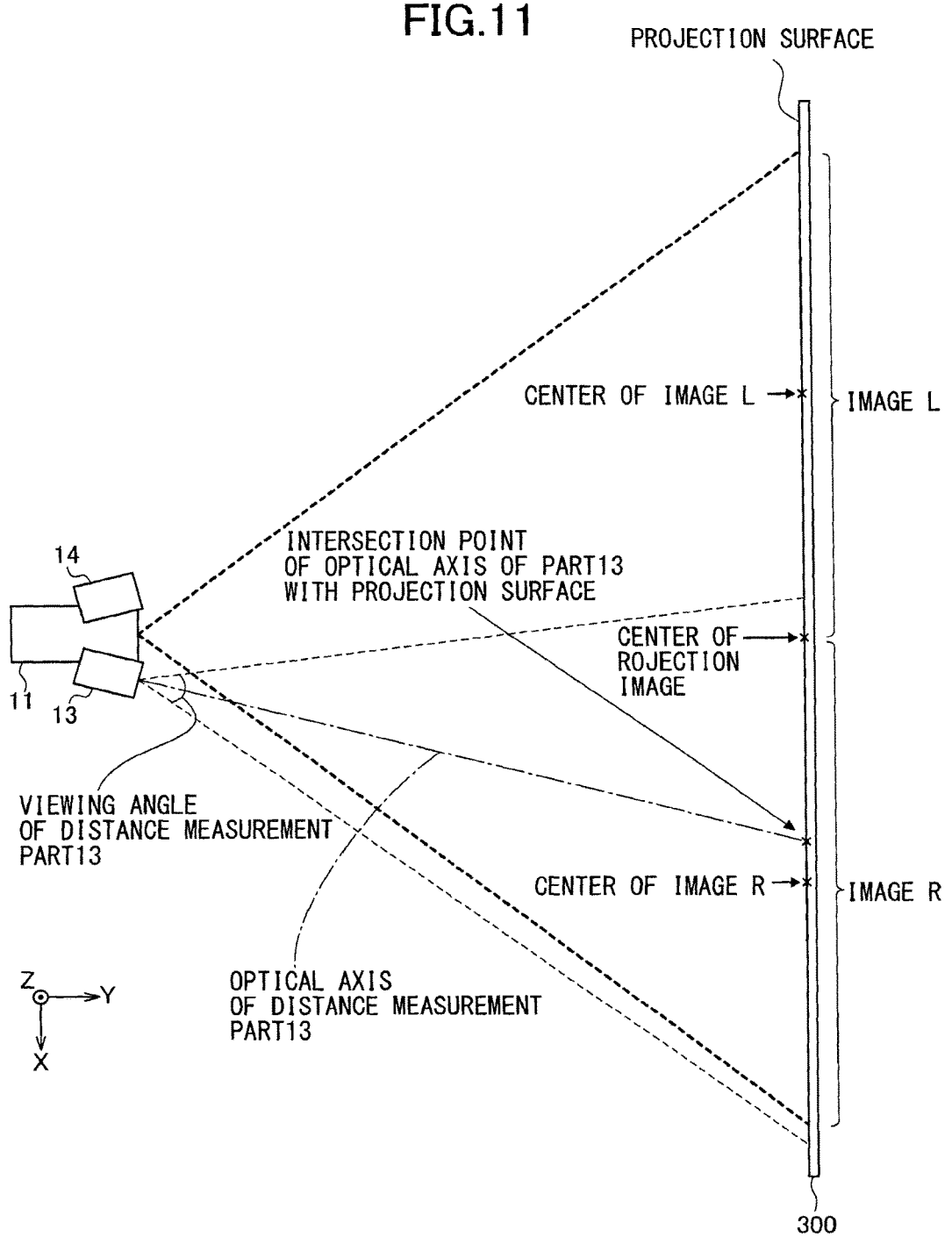
FIG. 11 is a second explanatory view for explaining the first distance measurement part and a projection image.
Figure 12:
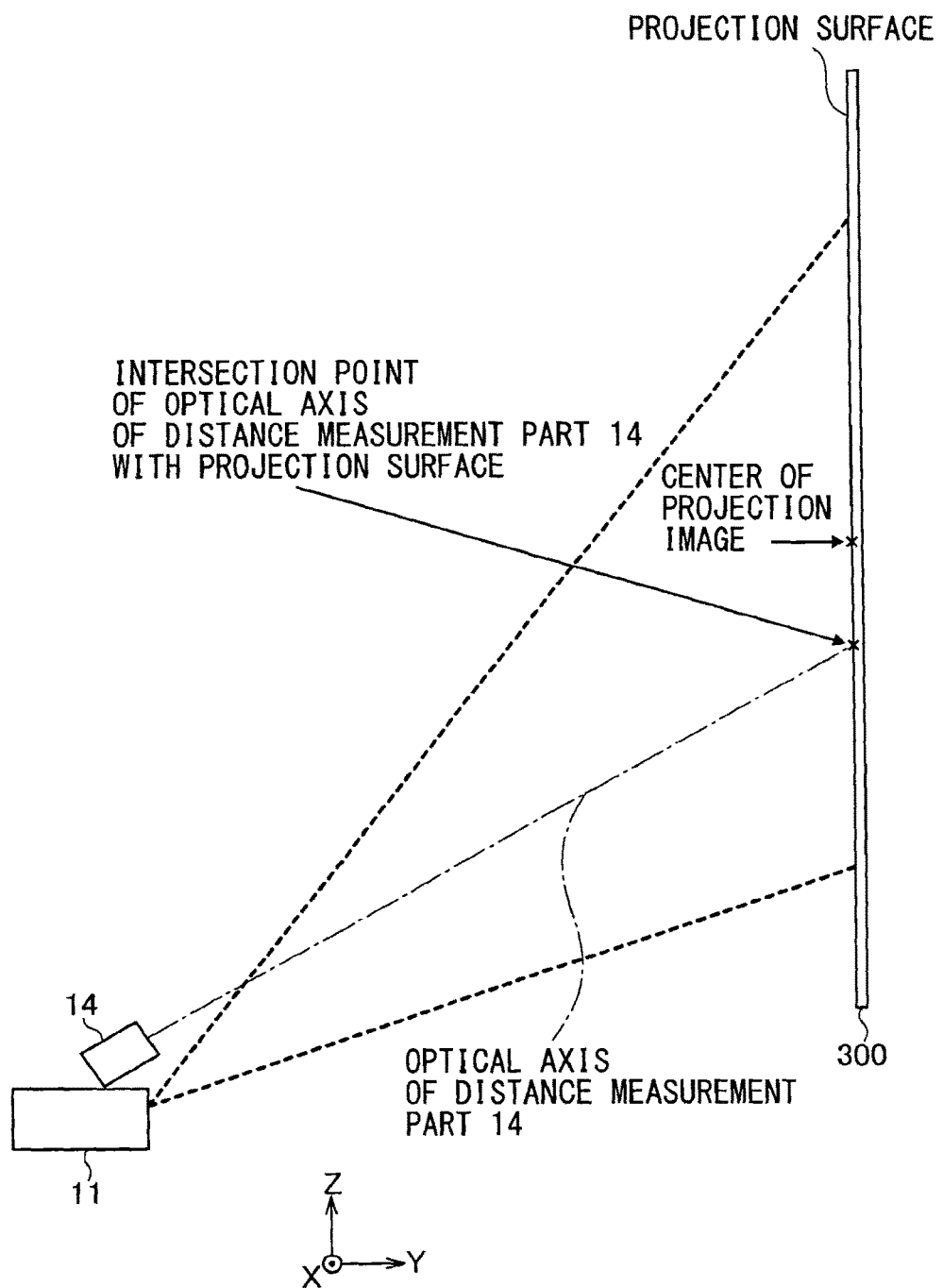
FIG. 12 is a first explanatory view for explaining the second distance measurement part and a projection image.

The first distance measurement part 13 is disposed such that the optical axis of the first distance measurement part 13 intersects with the projection surface at a position on the −Z axis side with respect to the center of the projection image (see FIG. 10) and on the −X axis side with respect to the center of the image R (see illustrated FIG. 11). That is, the first distance measurement part 13 is also disposed at a position on the −Z axis side with respect to the center of the projection image (see FIG. 10) and on the −X axis side with respect to the center of the image R (see illustrated FIG. 11).

Figure 13:
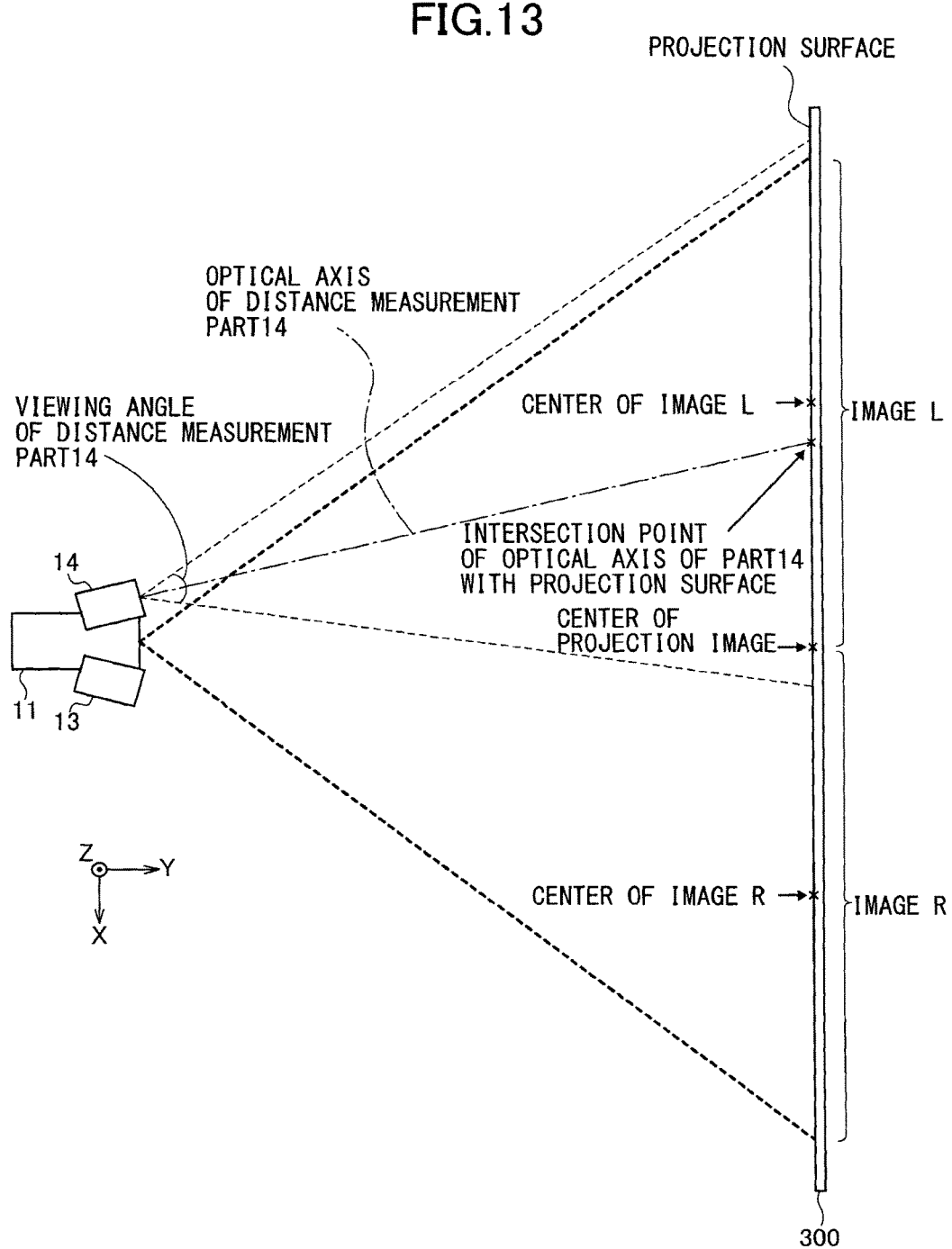
FIG. 13 is a second explanatory view for explaining the second distance measurement part and a projection image.

The second distance measurement part 14 is disposed such that the optical axis of the second distance measurement part 14 intersects with the projection surface at a position on the −Z axis side with respect to the center of the projection image (see FIG. 12) and on the +X axis side with respect to the center of the image L (see illustrated FIG. 13). That is, the second distance measurement part 14 is also disposed at a position on the −Z axis side with respect to the center of the projection image (see FIG. 12) and on the +X axis side with respect to the center of the image L (see illustrated FIG. 11).

As explained above, in this embodiment, the optical axes of the first and second distance measurement parts 13, 14 intersect with the projection surface at the positions (intersection point) on the same sides as those of the installation positions of the corresponding distance measurement parts 13, 14 with respect to the center of the corresponding images.

Figure 14:
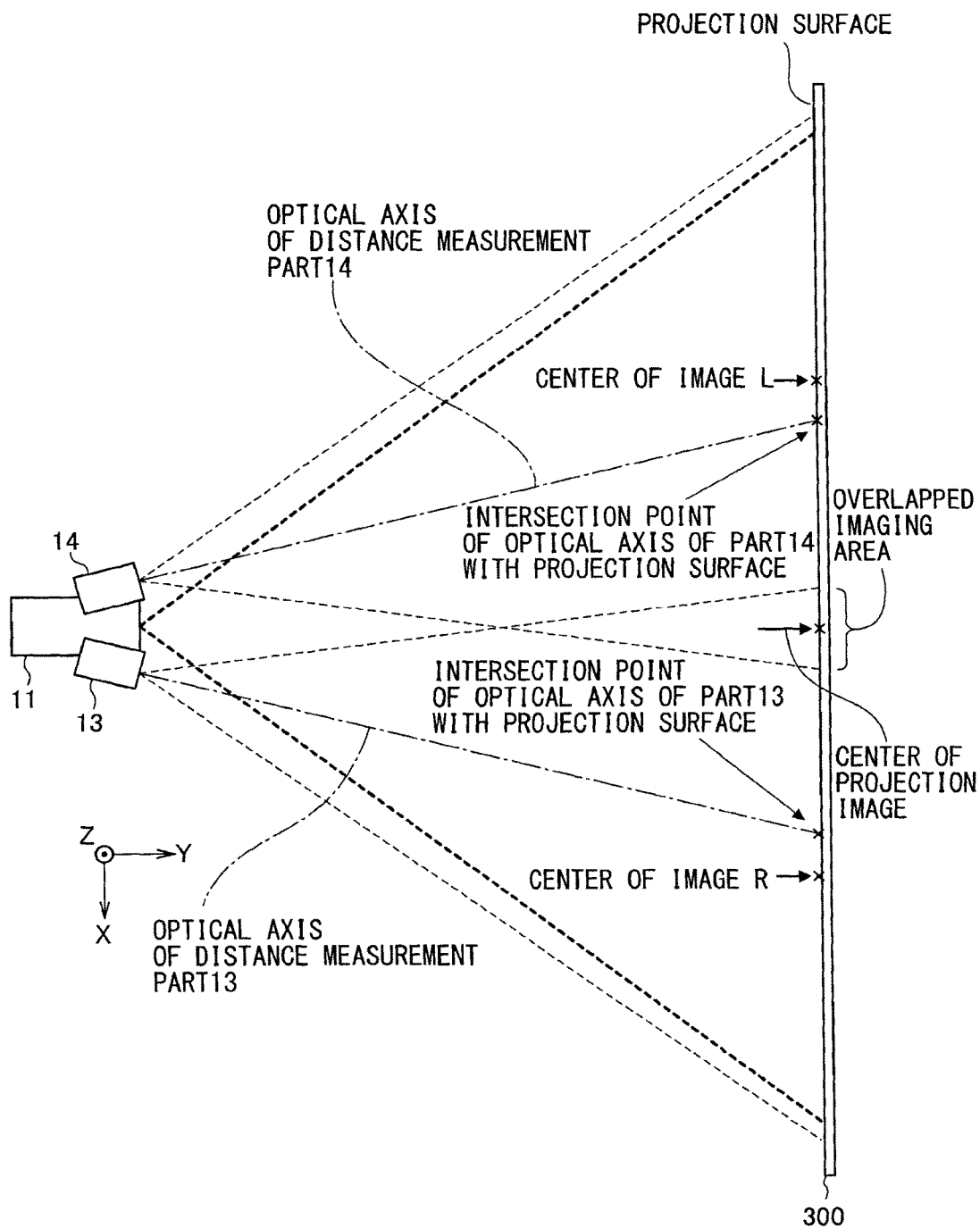
FIG. 14 is an explanatory view for explaining an area where an imaging area of the first distance measurement part and an imaging area of the second distance measurement part are overlapped.

Note that the imaging areas of the first and second distance measurement parts 13, 14 are partially overlapped with each other at around the center of the projection image (see FIG. 14). With this, it can ensure to capture the center portion of the projection image regardless of the installation errors of the distance measurement parts 13, 14.

The first arithmetic part 133 calculates a distance to the imaging target based on a light-emission timing of the first light-emission part 131 and a projection timing to capture the reflection light with the first image sensor 132a. Further, the first arithmetic part 133 acquires three-dimensional data (projection data) of the projection image (i.e., a depth map). Note that the center of the acquired depth map corresponds to the optical axis of the first distance measurement part 13.

The first arithmetic part 133 acquires the depth map of the imaging target at a predetermined interval (framerate) and sends the depth map to the processor 15.

The second arithmetic part 143 calculates a distance to the imaging target based on a light-emission timing of the second light-emission part 141 and a projection timing to capture the reflection light with the second image sensor 142a. Further, the second arithmetic part 143 acquires three-dimensional data (projection data) of the photographed image (i.e., a depth map). Note that the center of the acquired depth map corresponds to the optical axis of the second distance measurement part 14.

The second arithmetic part 143 acquires the depth map of the imaging target at a prescribed interval (framerate) and sends the depth map to the processor 15.

The processor 15 combines the depth map acquired by the first arithmetic part 133 and the depth map acquired by the second arithmetic part 143 to generate a depth map for the entire projection image. The processor 15 then determines a position and movement of the inputting means based on the generated depth map for the entire projection image and further detects input operation data in response to the determined position and movement. The processor 15 sends the detected input operation data to the image management device 30.

Upon receiving the input operation data from the processor 15, the image management device 30 executes imaging control in accordance with the input operation data. As a result, the input operation data are reflected on the projection image.

Figure 15:
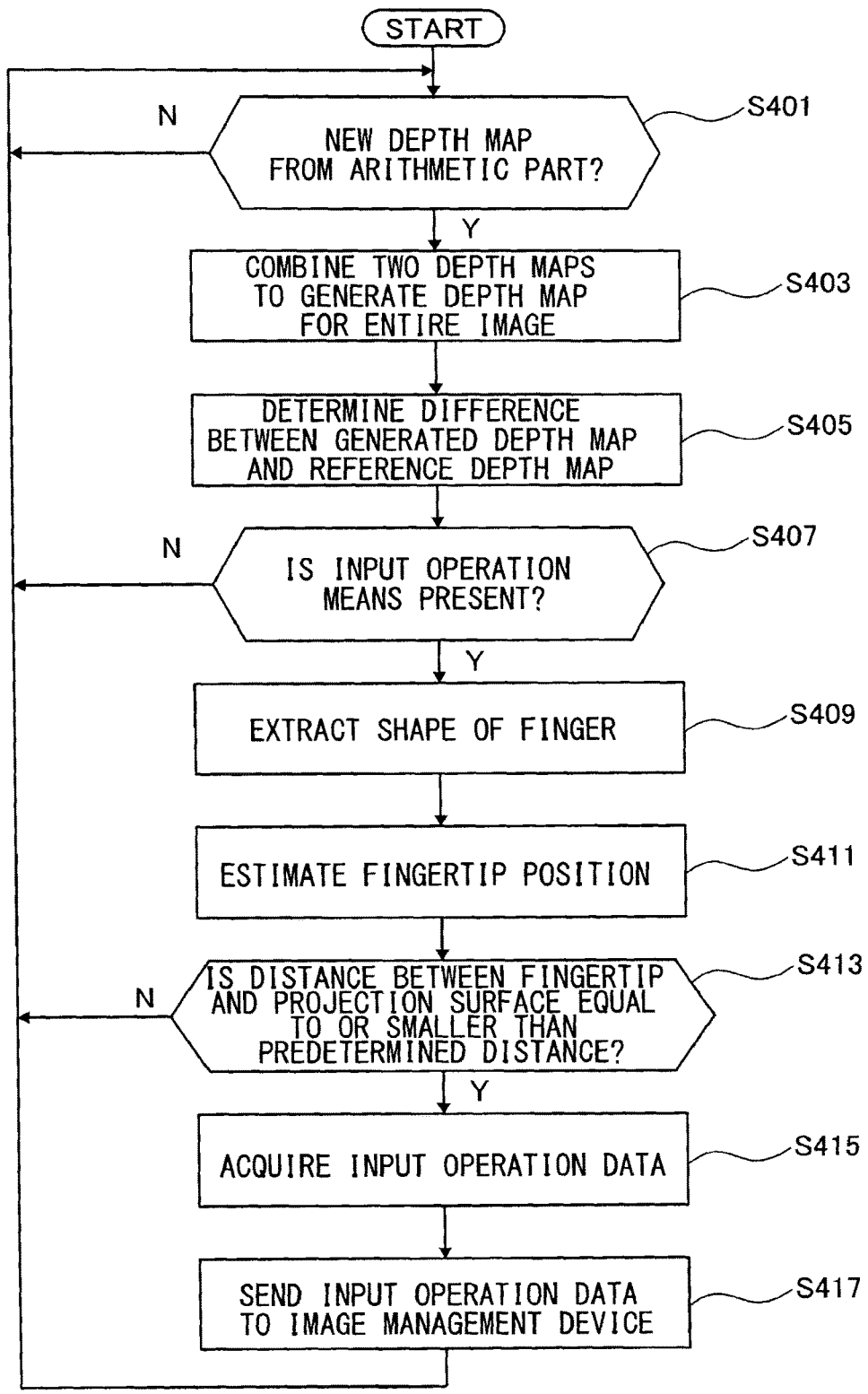
FIG. 15 is a flowchart for explaining input operation detection process executed by a processor.

Next, a process to detect the input operation data (input operation detection process) executed by the processor 15 will be described with reference to the flowchart of FIG. 15.

Note that before executing the following process, the processor 15 has a depth map of the imaging target in which no input operation means is present, and the processor 15 stores the map in a memory (not illustrated) of the processor 15 as a reference depth map. In the following description, the inputting means is user's finger.

In the first step S401, the processor 15 determines whether a new depth map is sent from each of the arithmetic part 133, 143. When the processor 15 receives a new depth map from each of the arithmetic part 133, 143, the determination result becomes affirmative and the program proceeds to the step S403.

In the step S403, the processor 15 combines the depth map acquired by the first arithmetic part 133 and the depth map acquired by the second arithmetic part 143 to generate a depth map for the entire projection image. The program then proceeds to step S405.

In the step S405, the processor 15 determines a difference between the generated depth map for the entire projection map and the reference depth map. That means, the processor 15 determines the difference between the depth maps with and without user's finger inside the projection areas of the distance measurement parts 13, 14. By determining the difference, the processor 15 offsets the distance data of the projection surface (projection image) and calculates only the distance data of the finger. Note that hereinafter, the difference is also called "differential depth map".

The program then proceeds to the step S407, in which the processor 15 determines whether the input operation means (i.e., user's finger) is present in the projection area based on the differential depth map. When the value of the differential depth map is equal to or smaller than a threshold value, the processor 15 determines that the input operation means is not present in the projection area and the program returns to the step S401. On the other hand, when the value is greater than the threshold value, the processor 15 determines that the input operation means is present and the program proceeds to the step S409.

In the step S409, the processor 15 extracts the shape of the user's finger by executing known image processing on the differential depth map. The program then proceeds to the step S411.

In the step S411, the processor 15 estimates the fingertip position of the user's finger based on the extracted finger shape. The program then proceeds to the step S413.

In the Step S413, in accordance with the differential depth map, the processor 15 estimates the fingertip position (also called "differential distance") in the Y axis direction using the projection surface as the reference. Based on the estimated fingertip position, the processor 15 determines whether the fingertip touches or is close to the projection surface. When the estimated differential distance is equal to or shorter than a predetermined distance (e.g., 3 mm), the determination result becomes affirmative and the program proceeds to step S415.

In the step S415, the processor 15 detects and acquires the input operation data based on the fingertip position and the fingertip movement. The input operation data may be an input operation to click an icon which is projected on the projection image and is pointed by the fingertip, or the input operation data may be an input operation to enter a letter or to draw a line on the projection image if the fingertip moves over the projection image.

In the next step S417, the processor 15 sends the detected input operation data to the image management device 30. The image management device 30 executes an image control in response to the input operation data. That is, the input operation data is reflected on the projection image. The program then returns to the step S401.

Note that when the differential distance is greater than the predetermined distance (e.g., 3 mm) in the step S413, the program returns to the step S401.

Here, a relationship between the first distance measurement part 13 and image R will be described based on specific examples. Note that in the specific examples, to facilitate understanding, the size of the projection area of the first distance measurement part 13 is set to be the same as the size of the image R. Further, the first distance measurement part 13 is disposed on the YZ surface which includes the center of the projection image.

Figure 16:
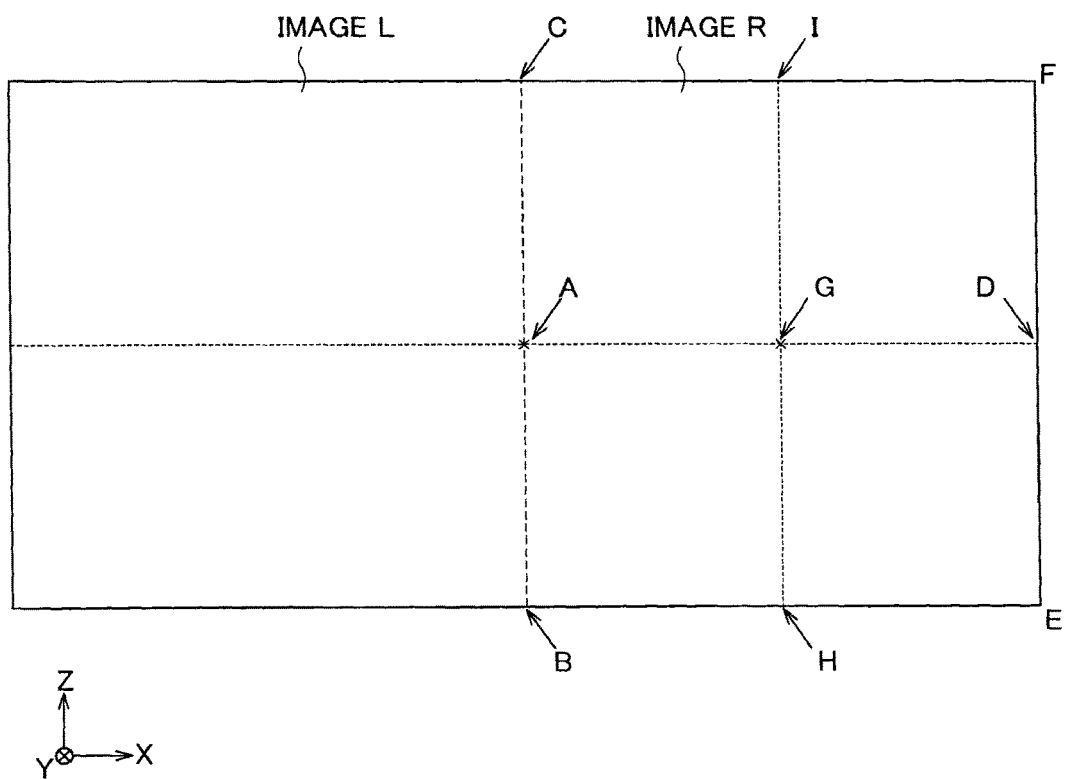
FIG. 16 is an explanatory view for explaining reference sings attached to the image R.

As illustrated in FIG. 16, reference signs A to I are marked on the projection image. The point A indicates the center of the projection image. The point B indicates an intersection of the line passing through the point A and in parallel to the Z axis with the edge of the projection image on the −Z axis side. The point C indicates an intersection of the line passing through the point A and in parallel to the Z axis with the edge of the projection image on the +Z axis side. The point D indicates an intersection of the line passing through the point A and in parallel to the X axis with the edge of the projection image on the +X axis side. The point E indicates an intersection of the line passing through the point D and in parallel to the Z axis with the edge of the projection image on the −Z axis side. The point F indicates an intersection of the line passing through the point D and in parallel to the Z axis with the edge of the projection image on the +Z axis side. The point G indicates the center of the image R. The point H indicates an intersection of the line passing through the point G and in parallel to the Z axis with the edge of the projection image on the −Z axis side. The point I indicates an intersection of the line passing through the point G and in parallel to the Z axis with the edge of the projection image on the +Z axis side.

Example 1

Figure 17:
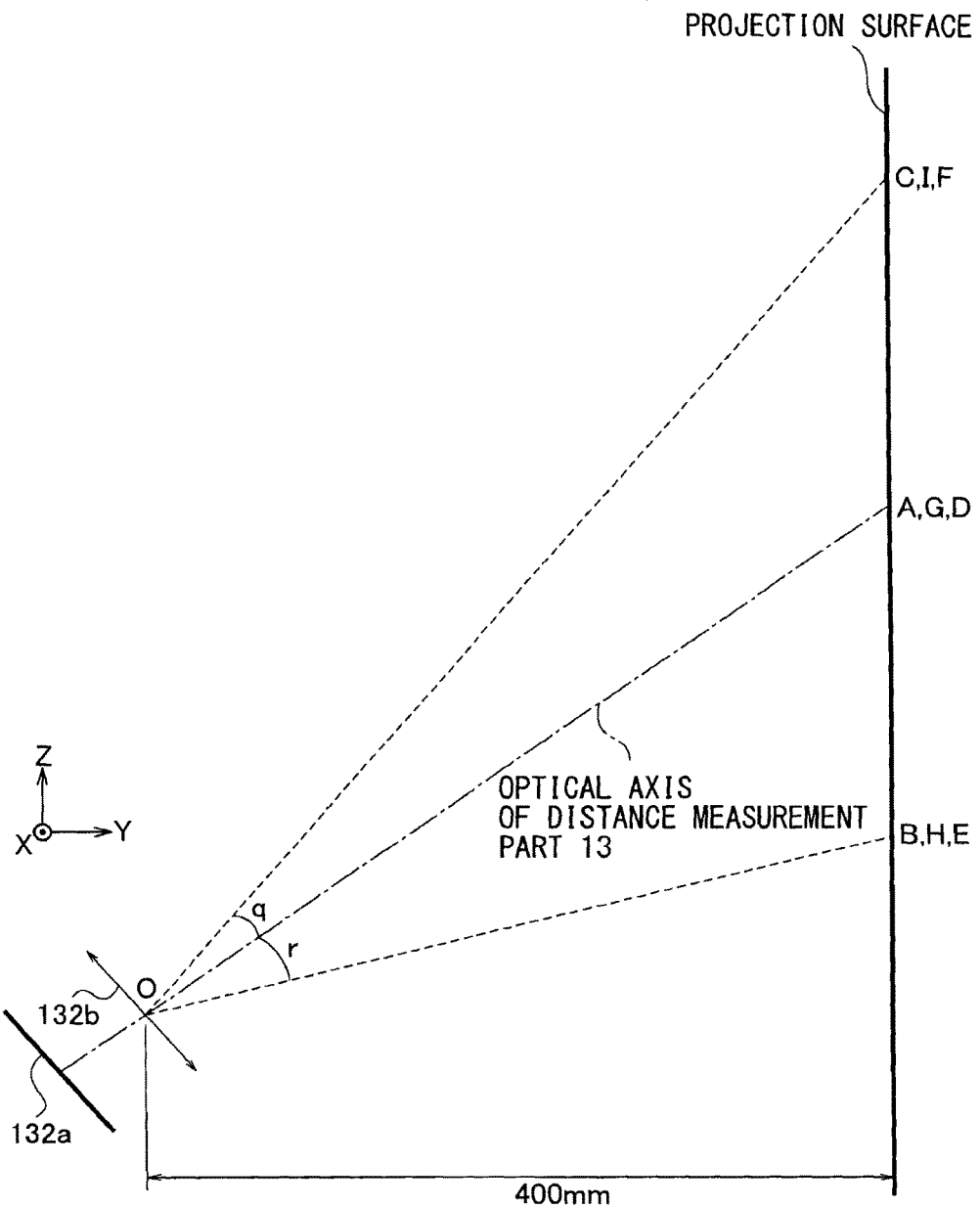
FIG. 17 is an explanatory view for explaining a comparative example.
Figure 18:
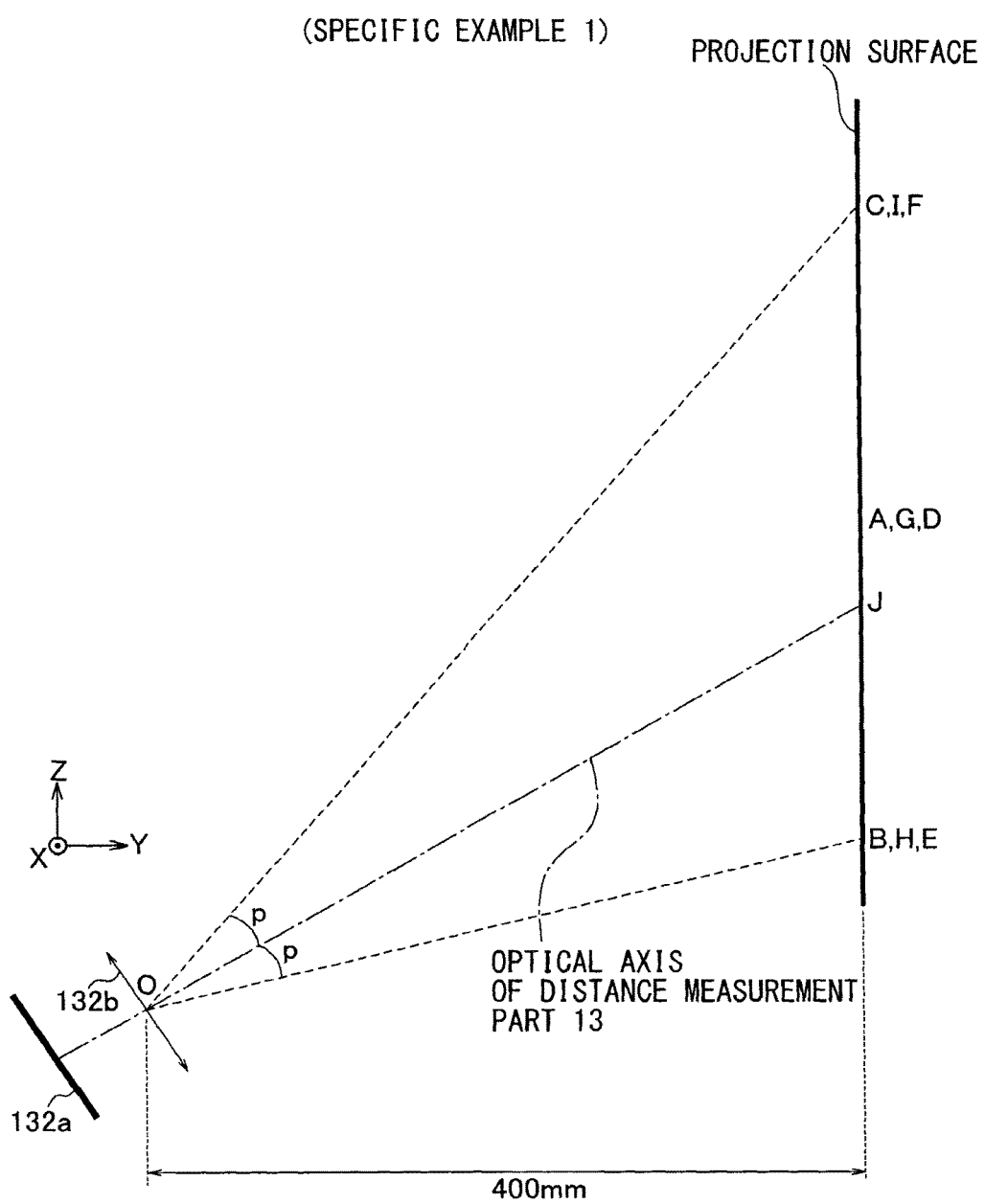
FIG. 18 is an explanatory view for explaining a first specific example of the embodiment.
Figure 19:
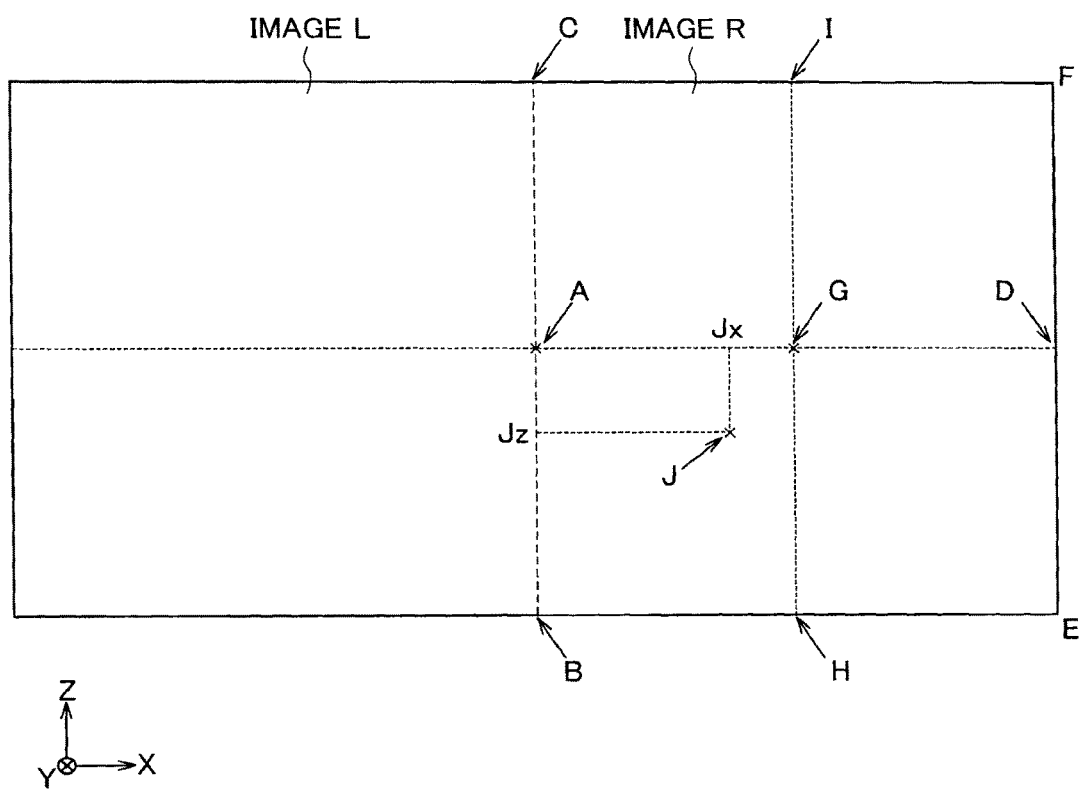
FIG. 19 is an explanatory view for explaining a point J at which an optical axis of the first distance measuring part intersects with the projection image in the first specific example.

FIG. 17 illustrates a comparative example, and FIG. 18 illustrates a first specific example (Example 1). The difference between the comparative example and Example 1 is inclination angles of the optical axes of the first distance measurement parts 13 with respect to the Y axis direction. In the comparative example, the optical axis of the first distance measurement part 13 intersects with the projection surface at the center G of the image R. In Example 1, the optical axis of the first distance measurement part 13 intersects with the projection surface at a position on the −Z axis side and −X axis side with respect to the center G of the image R (i.e., at a point J as illustrated in FIG. 19).

An intersection of a line passing through the point J and in parallel to the Z axis with a line passing through the point A and in parallel to the X axis is defined as a point Jx. An intersection of a line passing through the point J and in parallel to the Z axis with a line passing through the point A and in parallel to the Z axis is defined as a point Jz. The point Jx divides an angle ∠AOD into two (i.e., ∠AOJx=∠JxOD). Further, the point Jy divides an angle ∠BOC into two (i.e., ∠BOJy=∠JyOC).

In Example 1 and the comparative example, the distance in the Y axis direction from the center of the first imaging optical system 132b to the projection surface is set to 400 mm, and the size of a projection image projected on the projection surface is set to 60 inches (with the aspect ratio of 16:9). That is, the width of the projection image in the X axis direction is 1328 mm and the height of the projection image in the Z axis direction is 747 mm.

FIG. 20 shows the numerical values of the comparative example and FIG. 21 shows the numerical values of Example 1 under the above condition. Here, the origin of the coordinate system is the center O of the first imaging optical system 132b. The edge of the projection image on the −Z axis side is defined to be 145 mm in the Z coordinate. In Example 1, the installation angle of the first distance measurement part 13 is determined such that the point J, at which the optical axis of the first distance measurement part 13 intersects with the projection image, is defined to be 274.0 mm in the X coordinate and 371.5 mm in the Y coordinate.

In the comparative example, the maximum half-viewing angle of the first imaging optical system 132b is ∠GOB and is −41.17 degree. In Example 1, the maximum half-viewing angle of the first imaging optical system 132b is ∠JOE and is −34.76 degree. That is, Example 1 can reduce the half-viewing angle by 6.41 degree from that of the comparative example. As is known, when the half-viewing angle exceeds 45 degree (i.e., viewing angle 90 degree), reducing the angle by 6.41 degree would have a relatively great advantage in terms of aberrations and manufacturing costs.

As described above, the installation angle of the first distance measurement part 13 is determined such that the point J, at which the optical axis of the first distance measurement part 13 intersects with the projection image, locates on the −Z axis side and on the −X axis side with respect to the center G of the image R. With this, it becomes possible to reduce the maximum half-viewing angle.

Example 2

Figure 22:
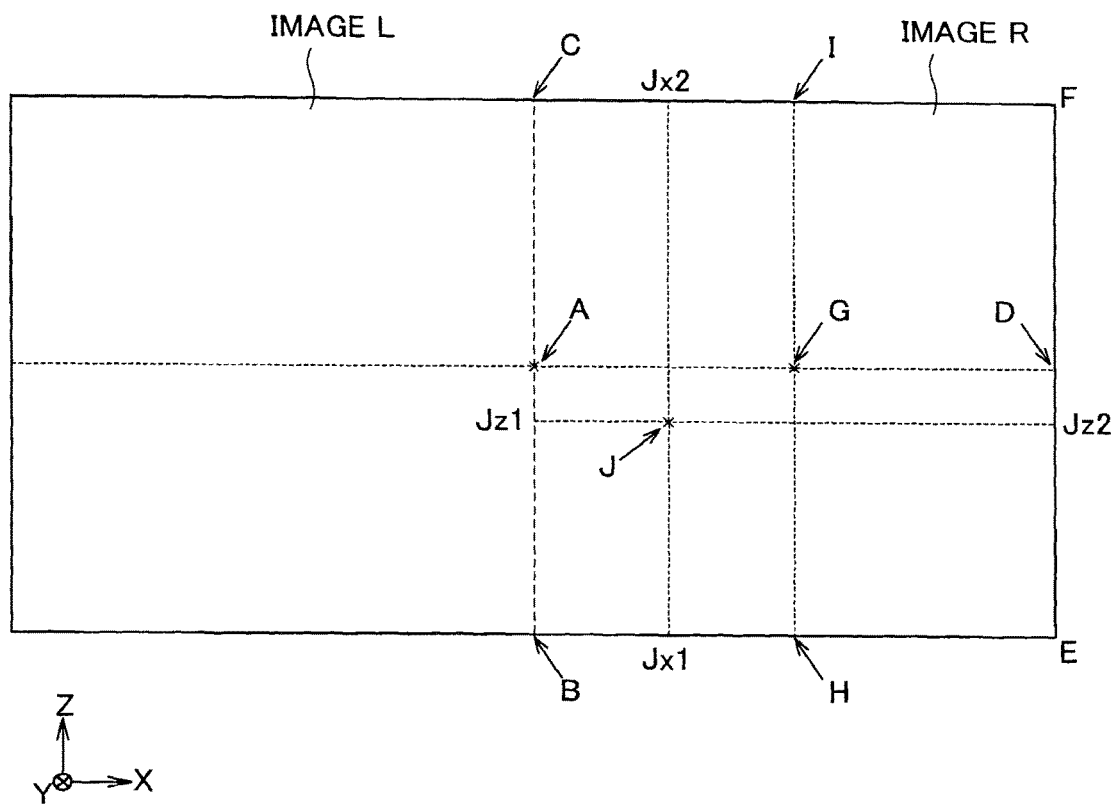
FIG. 22 is an explanatory view for explaining a point J at which an optical axis of the first distance measuring part intersects with the projection image in a second specific example.

A second specific example (Example 2) will be explained with reference to FIGS. 22 and 23. In Example 2, the installation angle of the first distance measurement part 13 is determined such that the point J, at which the optical axis of the first distance measurement part 13 intersects with the projection image, is defined to be 260.3 mm in the X coordinate and 391.7 mm in the Z coordinate. Since the X coordinate of the center G of the image R is 332.1 mm and the Z coordinate thereof is 518.6 mm, the point J locates on the −Z axis side and −X axis side with respect to the center G of the image R.

An intersection of a line passing through the point J and in parallel to the Z axis with the edge of the projection image on the −Z axis side is defined as a point Jx1. An intersection of a line passing through the point J and in parallel to the Z axis with the edge of the projection image on the +Z axis side is defined as a point Jx2. Further, an intersection of a line passing through the point J and in parallel to the X axis with a line passing through the point A and in parallel to the Z axis is defined as a point Jz1. An intersection of a line passing through the point J and in parallel to the X axis with an edge of the projection image on the +X axis side is defined as a point Jz2.

The point J is the center of the viewing angle in the direction parallel to the X axis and the center of the viewing angle in the direction parallel to the Z axis. That is, it satisfies ∠Jy1OJ=∠JOJy2 and ∠Jx1OJ=∠JOJx2.

In Example 2, the maximum half-viewing angle of the first imaging optical system 132b is ∠JOE and is −36.85 degree. That is, Example 2 can reduce the half-viewing angle by 4.32 degree from that of the comparative example. As is known, when the half-viewing angle exceeds 45 degree (i.e., viewing angle 90 degree), reducing the angle by 4.32 degree would have a relatively great advantage in terms of aberrations and manufacturing costs.

Although the detailed description is omitted here, the relationship between the second distance measurement part 14 and the image L is the same as that of between the first distance measurement part 13 and the image R.

Next, a position and a size of an image R imaged on a light receiving surface of the first image sensor 132a using the first imaging part 132 will be described. Hereinafter, the image imaged on the light receiving surface of the first image sensor 132a is also called a "photographed image."

Figure 24:
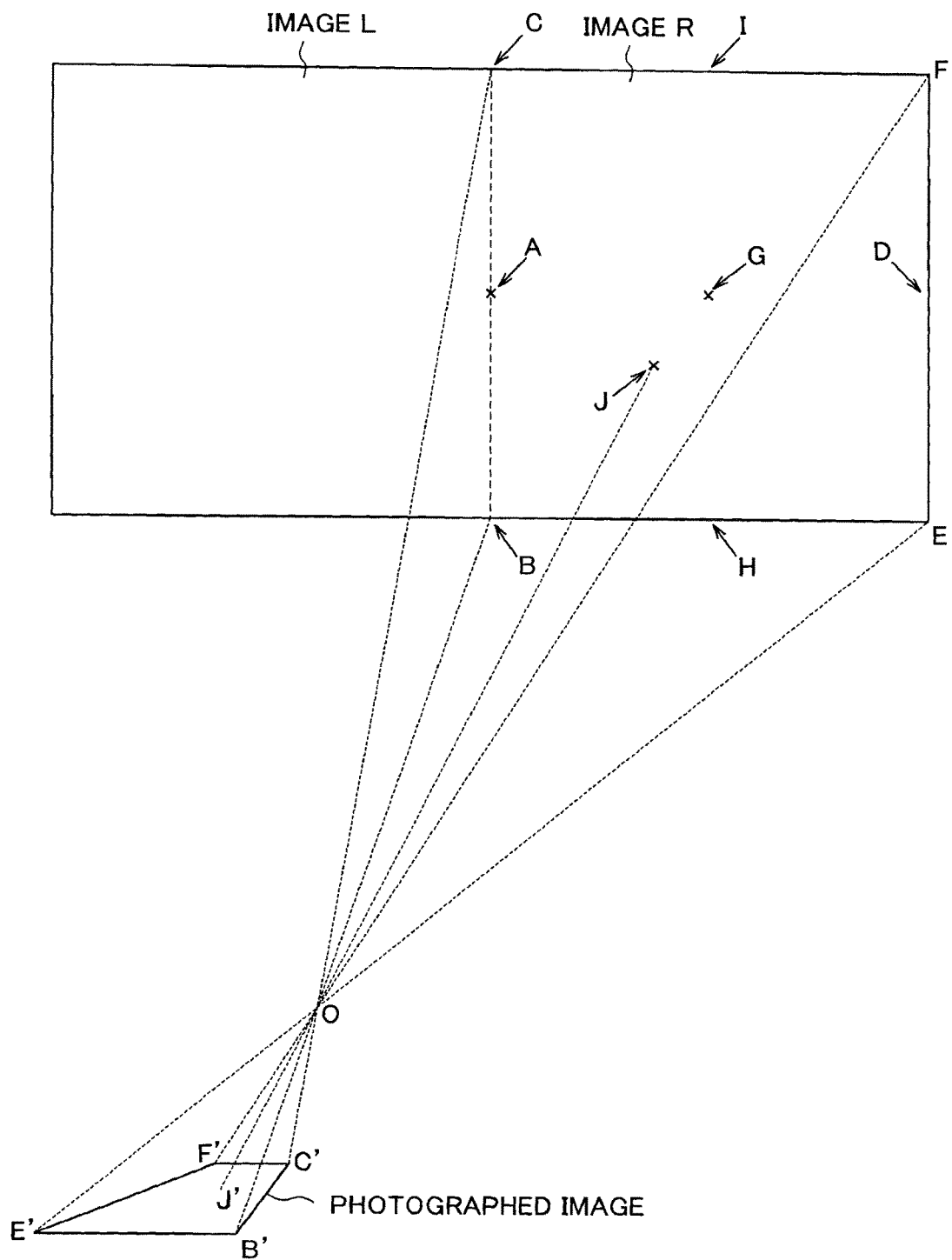
FIG. 24 is a first explanatory view for explaining a photographed image.
Figure 25:
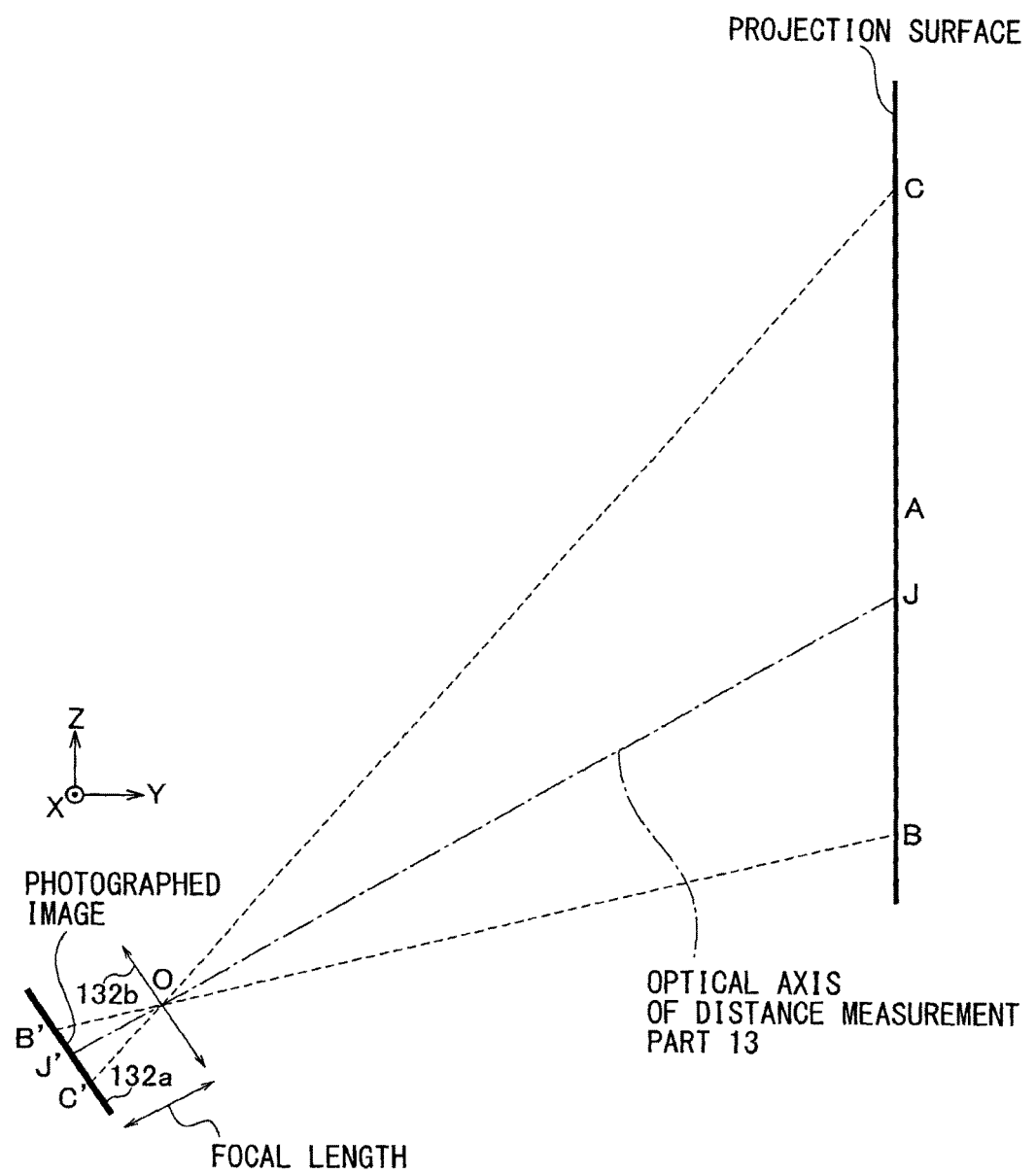
FIG. 25 is a second explanatory view for explaining the photographed image.

FIGS. 24 and 25 illustrate the photographed image of the image R imaged on the light receiving surface of the first image sensor 132a. In FIG. 24, reference sings B', C', E', F', and J' on the photographed image respectively correspond to the reference sings B, C, E, F, and J on the image R. Since the projection surface and the light receiving surface of the image sensor 132a are not parallel to each other, the shape of the projection image is not an exact rectangular shape but a deformed rectangular shape (e.g., a trapezoid shape).

Figure 26:
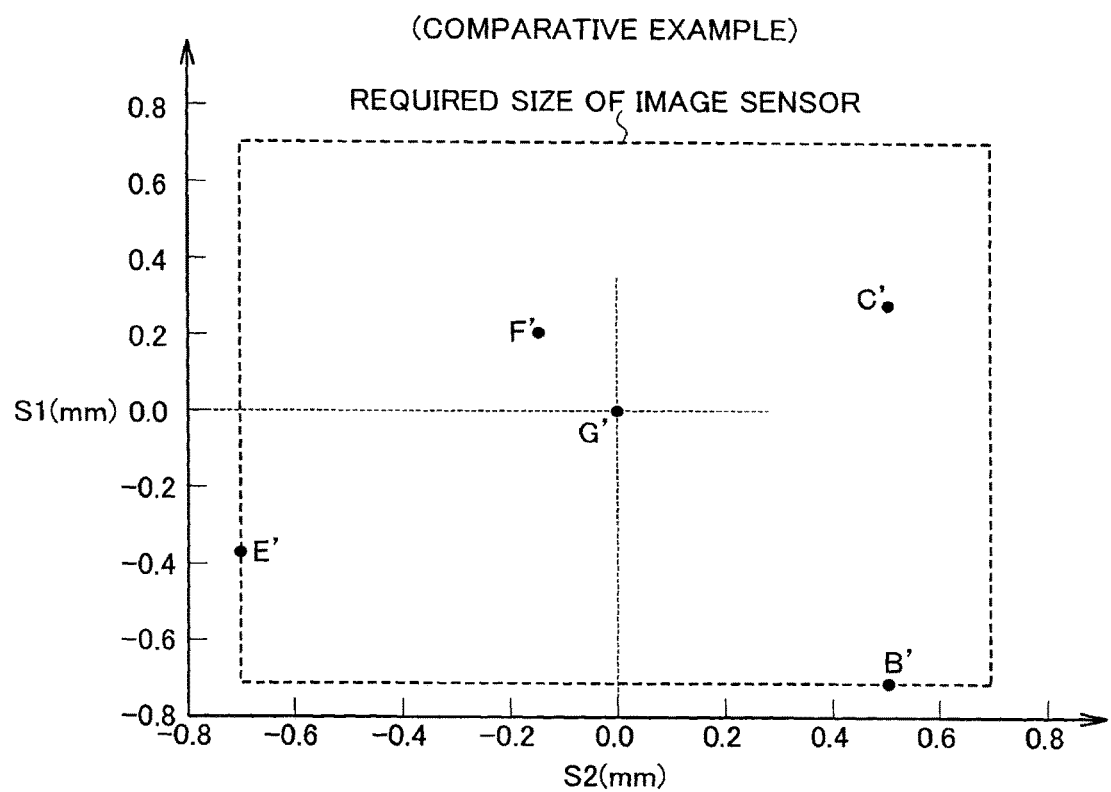
FIG. 26 is an explanatory view for explaining a required size of an imaging element in the comparative example.

FIGS. 26 and 27 show calculated coordinate values of the points B', C', E', F', and G' on the photographed image in the comparative example. Note that to facilitate understanding, the focal length of the first imaging optical system 132b is set to 1 mm. In addition, the optical axis of the imaging optical systems 132b is indicated as an S0 direction, a direction parallel to the X axis on the light receiving surface of the first image sensor 132a is indicated as an S2 direction, and a direction orthogonal to the S0 and S2 direction is indicated as an S1 direction.

The point G' is on the optical axis of the first distance measurement part 13 and the center of the light receiving surface of the first image sensor 132a. Here, the coordinate value of the point G' is defined as (S0, S1, S2)=(0, 0, 0). Since the angles ∠GOB and ∠GOE are relatively large, the points B' and E' are located away from the point G', and the points C', F' and G' are located near the point G'.

As shown in FIG. 27, the maximum value of the absolute value of the coordinate values in the S2 direction is 0.693, and the maximum value of the absolute value of the coordinate values in the S1 direction is 0.712. The rectangle drawn by a dot line in FIG. 26 indicates the size of the image sensor 132a required to capture the image R when setting the origin ((S1, S2)=(0, 0)) as the center. The rectangle circumscribes to the photographed image imaged by the first imaging part 132 and includes the points B', C', E', and F'. Here, the square area of the rectangle is 0.493 mm$^2$ (i.e., 0.693×0.712).

Figure 28:
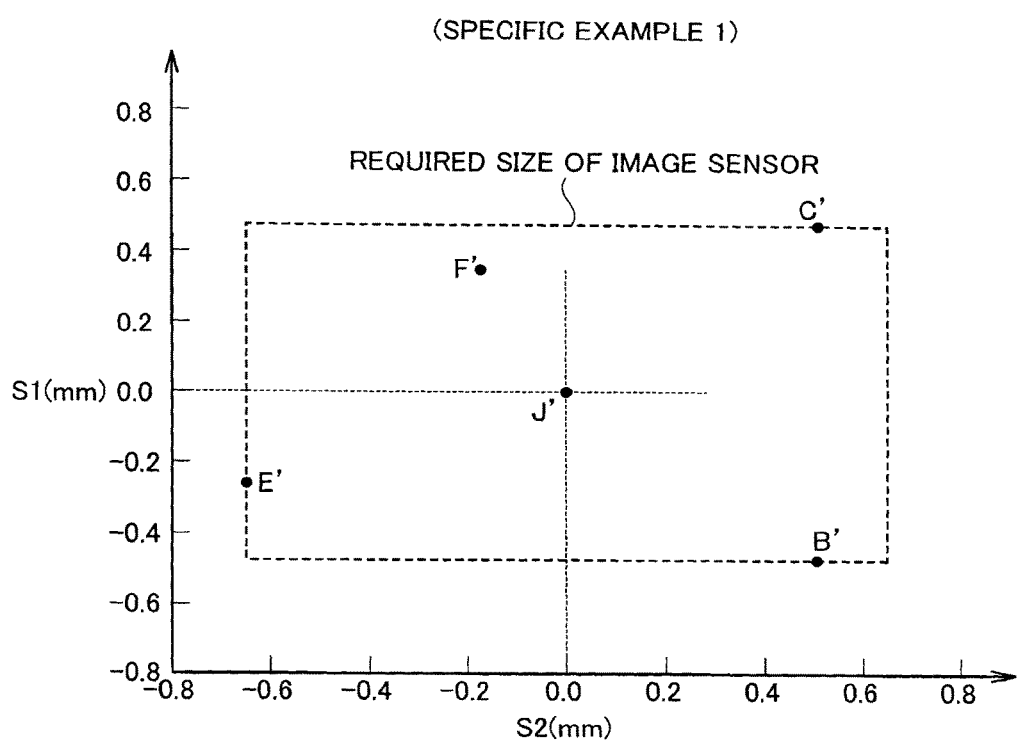
FIG. 28 is a first explanatory view for explaining a required size of an imaging element in the first specific example.

FIGS. 28 and 29 show calculated coordinate values of the points B', C', E', F', and J' on the photographed image in Example 1. The point J' exists on the optical axis of the first distance measurement part 13 and, therefore, positioned at the center of the light-receiving surface of the image sensor 132a. Accordingly, the coordinate values of the point J' is defined as (S0, S1, S2)=(0, 0, 0).

Here, the angle ∠JOB is equal to the angle ∠JOC, and the points B' and C' are symmetrically positioned with respect to the S1 direction. As shown in FIG. 29, the maximum value of the absolute value of the coordinate values in the S2 direction is 0.645, and the maximum value of the absolute value of the coordinate values in the S1 direction is 0.474. The rectangle drawn by a dot line in FIG. 28 indicates the size of the image sensor 132a required to capture the image R when setting the origin ((S1, S2)=(0, 0)) as the center. The rectangle circumscribes to the photographed image captured by the first imaging part 132 and includes the points B', C', E', and F'. Here, the square area of the rectangle is 0.306 mm$^2$ (i.e., 0.645×0.474).

The rectangle of Example 1 is smaller than the rectangle of the comparative example. Specifically, the square area ratio of the rectangles of Example 1 with respect to the comparative example becomes 62%. That is, by shifting the intersection point, at which the optical axis of the first distance measurement part 13 intersects with the projection surface, toward the installation position side of the first distance measurement part 13 with respect to the center of the image R; it becomes possible to use a smaller image sensor while reducing the field angle of the first imaging optical system.

In this case, the intersection point, at which the optical axis of the first distance measurement part 13 intersects with the projection surface, is determined such that the center of the rectangle of the first imaging part 132 matches the center of the first image sensor 132a.

Figure 30:
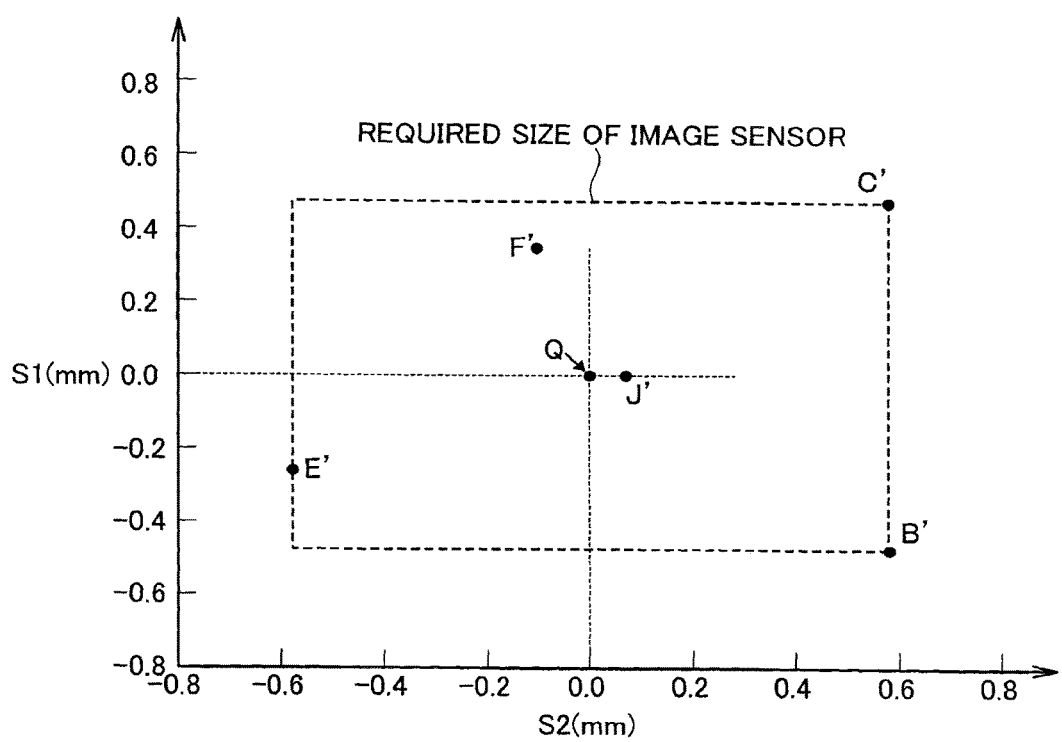
FIG. 30 is a second explanatory view for explaining a required size of an imaging element in the first specific example.

In the image sensor 132a to capture the image R illustrated in FIG. 28, a portion on the positive side (+side) in the S2 direction with respect to the points B' and C' is redundant. Therefore, the center of the rectangle may be adjusted and shifted to a point Q such that the points B' and C' locate at the edges of the rectangle, as illustrated in FIG. 30. In this case, the square area of the adjusted rectangle becomes 0.272 mm$^2$ (i.e., 0.574×0.474). As a result, the square area ratio of the adjusted rectangle with respect to the comparative example becomes 55%.

Note that the intersection point, at which the optical axis of the first distance measurement part 13 intersects with the projection surface, is determined such that the center of the rectangle of the first imaging part 132 matches the center of the first image sensor 132a in this case as well.

Figure 31:
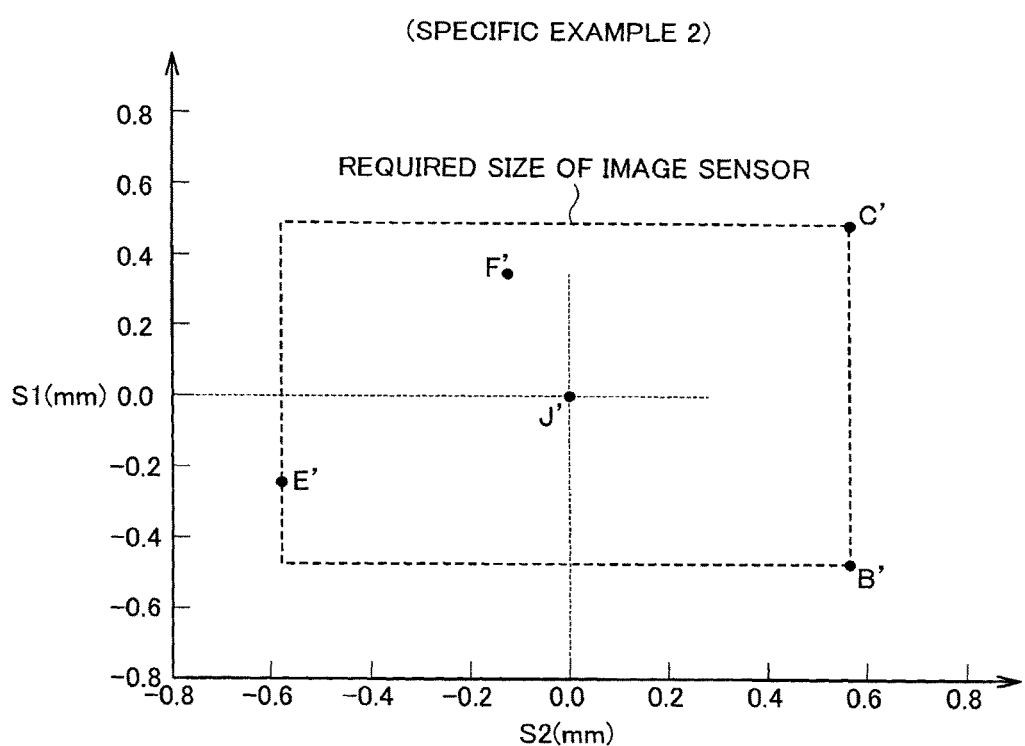
FIG. 31 is an explanatory view for explaining a required size of an imaging element in the second specific example.

FIGS. 31 and 32 show the calculated coordinate values of the points B', C', E', F', and J' on the photographed image in Example 2. The point J' is located on the optical axis of the first distance measurement part 13 and is the center of the light-receiving surface of the first image sensor 132a. Here, the coordinate values of the point J' is defined as (S0, S1, S2)=(0, 0, 0).

The points B' and C' are symmetrically positioned with respect to the S1 direction. The rectangle drawn by a dot line in FIG. 31 indicates the size of the image sensor 132a required to capture the image R when setting the origin ((S1, S2)=(0, 0)) as the center. In this example, the area of image sensor does not have a redundant portion. Note that the rectangle circumscribes the photographed image captured by the first imaging part 132 and includes the points B', C', E', and F'. Here, the square area of the rectangle is 0.279 mm$^2$ (i.e., 0.571×0.488).

That is, the rectangle in Example 2 is smaller than that of the comparative example, and the square area ratio of the rectangle in Example 2 with respect to the comparative example becomes 57%.

Here, the intersection point, at which the optical axis of the first distance measurement part 13 intersects with the projection surface, is determined such that the center of the rectangle circumscribing the photographed image is located in the vicinity of the center of the first image sensor 132a.

In the projection apparatus 10 according to the embodiment, the two distance measurement parts (13, 14) and the processor 15 correspond to an input operation detection device of the embodiment of the present invention.

Further, the first distance measurement part 13 corresponds to a first imaging section of the input operation detection device of the embodiment of the present invention, and the second distance measurement part 14 corresponds to a second imaging section of the input operation detection device of the embodiment of the present invention. Here, the image R corresponds to a first image, and the image L corresponds to a second image.

As described above, the projection apparatus 10 of the embodiment includes the projection part 11, two distance measurement parts (13, 14), and the processor 15. The projection image is divided into the image R (first image) and image L (second image) by the virtual line passing through the center of the projection image and in parallel to the Z axis (i.e., the projection image is divided into the images R, L with respect to the Z axis direction).

The projection part 11 projects an image on the screen 300 based on the commands of the processor 15. The first distance measurement part 13 includes the first light-emission part 131 to emit detection light toward the image R, the first imaging part 132 to capture the image R, and the first arithmetic part 133 to acquire (calculate) a depth map based on the captured image result of the first imaging part 132. The second distance measurement part 14 includes the second light-emission part 141 to emit detection light toward the image L, the second imaging part 142 to capture the image L, and the second arithmetic part 143 to acquire (calculate) a depth map based on the captured image result of the second imaging part 142. Each imaging part (132, 142) includes an image sensor (132a, 142a) and an imaging optical system (132b, 142b). The processor 15 detects input operation data input by inputting means in accordance with the depth map of the first distance measurement part 13 and the depth map of the second distance measurement part 14.

In each of the distance measurement part (13, 14), the optical axis of the corresponding distance measurement part intersects with the projection surface at the position (intersection point) on the same side as the installation position side of the corresponding distance measurement part (13, 14) with respect to the center of the corresponding image (R, L) in both the Z axis direction and the X axis direction.

Accordingly, the two distance measurement parts (13, 14) are appropriately disposed with respect to the projection image. As a result, it becomes possible to detect positions and movements of the inputting means in the entire projection image projected on the screen 300 at a high accuracy. Further, since the two distance measurement parts (13, 14) are used to cover the entire projection image, the field angle of each imaging optical system can be reduced. That is, it becomes possible to produce the imaging optical system at a low cost. Consequently, the input operation detection device including the two distance measurement parts (13, 14) and the processor 15 can be produced at a low cost without reducing the detection accuracy.

In this embodiment, when the estimated differential distance is equal to or shorter than the predetermined distance (e.g. 3 mm) in the input operation detection process, the processor 15 determines that a fingertip touches the projection surface. With this, even if the distance measurement parts have a distance measurement error, the user can perform desired input operations. Further, as explained, the processor 15 deems that the fingertip touches the projection surface even when the fingertip does not physically touch the projection surface but is present close enough to the projection surface (e.g. within 3 mm). Hence, it can improve the practically of the device.

Further, the two distance measurement parts 13, 14 of the embodiment are symmetrically disposed with respect to the XY surface, which includes the center of the projection image. That is, the configurations of the two distance measurement parts 13, 14 can be identical to each other. Accordingly, the distance measurement parts 13, 14 are easily assembled to the projection apparatus 10. Besides, since the two distance measurement parts 13, 14 are closely disposed to each other, these distance measurement parts 13, 14 are easily combined integrally. Additionally, the projection part 11 is disposed such that the optical axis of the projection part 11 coincides with the center of the projection image in the X axis direction. As a result, the two distance measurement parts 13, 14 are easily assembled with the projection part 11, and thus, it is possible to downsize the projection apparatus 10.

In the embodiment, each distance measurement part 13, 14 includes a light-emission part 131, 141. Each distance measurement part 13, 14 is arranged such that the light-emission direction of each distance measurement parts 13, 14 is coincide with the optical axis of the corresponding imaging optical system 132b, 142b. With this, the light-emission parts 131, 141 are easily and appropriately disposed, specifically, the distance measurement parts 13, 14 are appropriately configured with the input operation detection device.

The projection apparatus 10 according to the embodiment is equipped with the input operation detection device that includes the two distance measurement parts 13, 14 and the processor 15. Therefore, the projection apparatus 10 can perform the desired operations to project images accurately at a low cost.

The projection system 100 according to the embodiment includes the projection apparatus 10. As a result, it becomes possible to secure the performance at a low cost.

Note that in the above explanation, user's finger is exemplarily mentioned as the inputting means. However, it should not be limited thereto. The inputting means may be a pen or a stick, for example.

Here, the projection apparatus 10 and the image management device 30 may integrally be combined.

Figure 33:
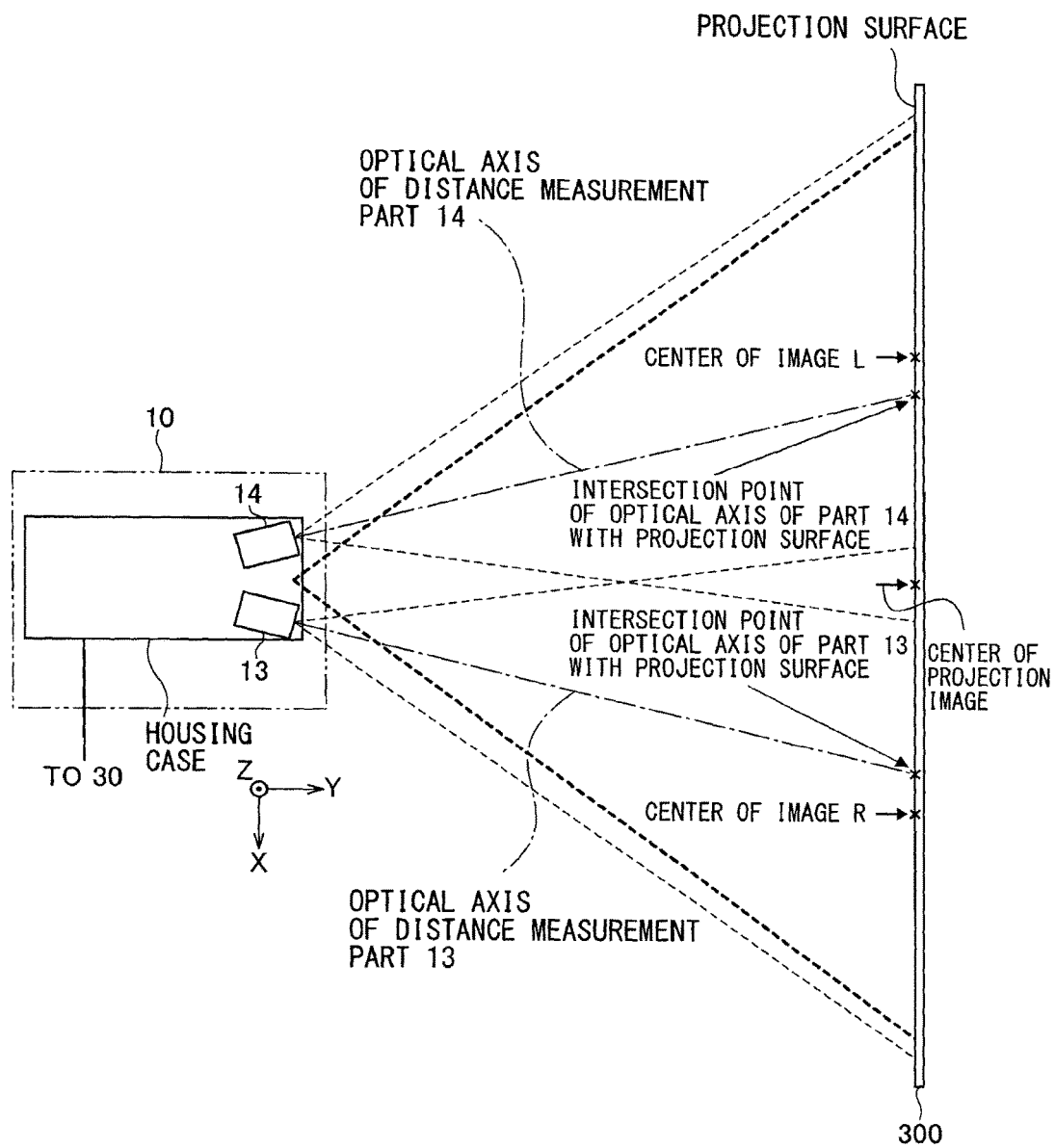
FIG. 33 is an explanatory view for explaining a first variation of a projection apparatus.

In the above-mentioned embodiment, the distance measurement parts 13, 14 may be detachably attached to the housing case with an attachment member (not illustrated), as illustrated in FIG. 33. Under such a configuration, the depth maps acquired by the distance measurement parts 13, 14 are sent through a cable to the processor 15 installed inside the housing case. Note that in this case, the distance measurement parts 13, 14 may be disposed at positions away from the housing case.

The two distance measurement parts 13, 14 may be accommodated in the housing case together with the projection part 11. Under such a configuration, the positional relationships of the projection part 11 and the two distance measurement parts 13, 14 can easily be optimized.

Further, the image management device 30 may execute a part of the above explained process executed by the processor 15. For instance, when the input operation detection process is executed by the image management device 30, the depth maps acquired by the distance measurement parts 13, 14 are sent to the image management device 30 through a cable or wirelessly.

Figure 34:
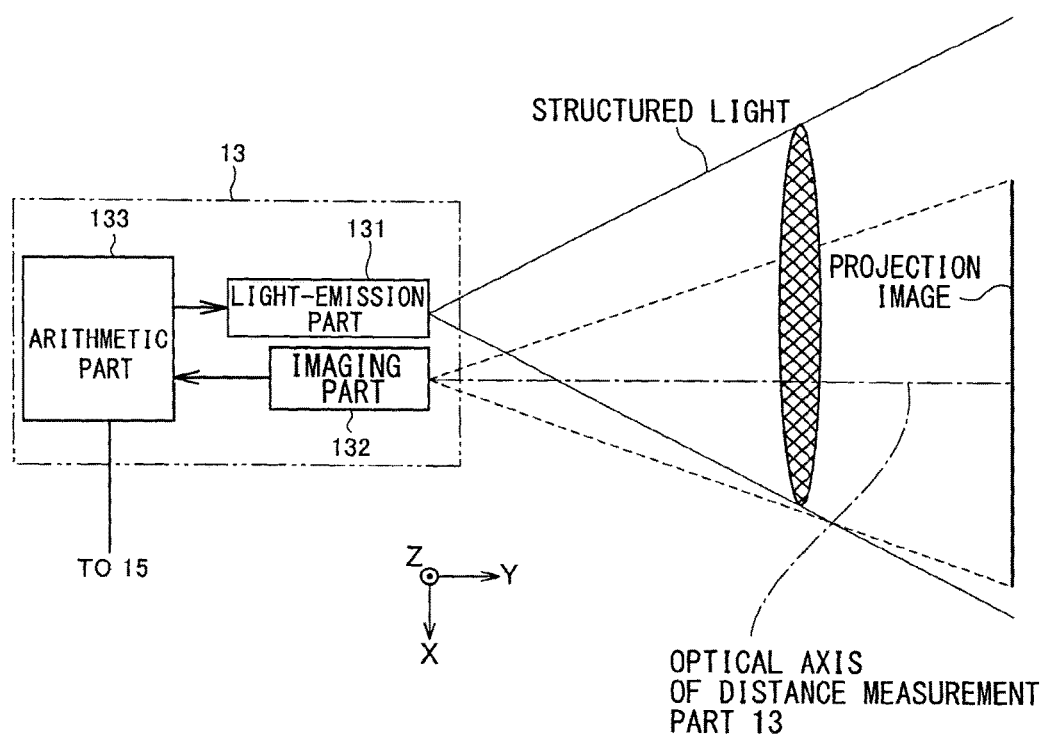
FIG. 34 is an explanatory view for explaining a first variation of the distance measurement parts.

Further, the light-emission parts 131, 141 of the distance measurement parts 13, 14 may emit structured light, as illustrated in FIG. 34 (only the first distance measurement part 13 is illustrated). Here, the structured light may mean the light applicable to the Structured Light methods. For instance, the structured light may be stripe-shaped light or matrix-shaped light. As is known, the irradiation region is larger than the projection image. Since the light emitted from the light-emission parts 131, 141 is near infrared light, the emission light do not disturb the user to see the projection image. The imaging parts 132, 142 capture an image of the structured light that has been reflected by the imaging target and deformed. Each of the arithmetic parts 133, 143 compares the light emitted from the corresponding light-emission part 131, 141 and the light imaged by the corresponding imaging part 132, 142 so as to acquire (calculated) the depth maps using the triangulation method. Note this is called a pattern projection method.

Figure 35:
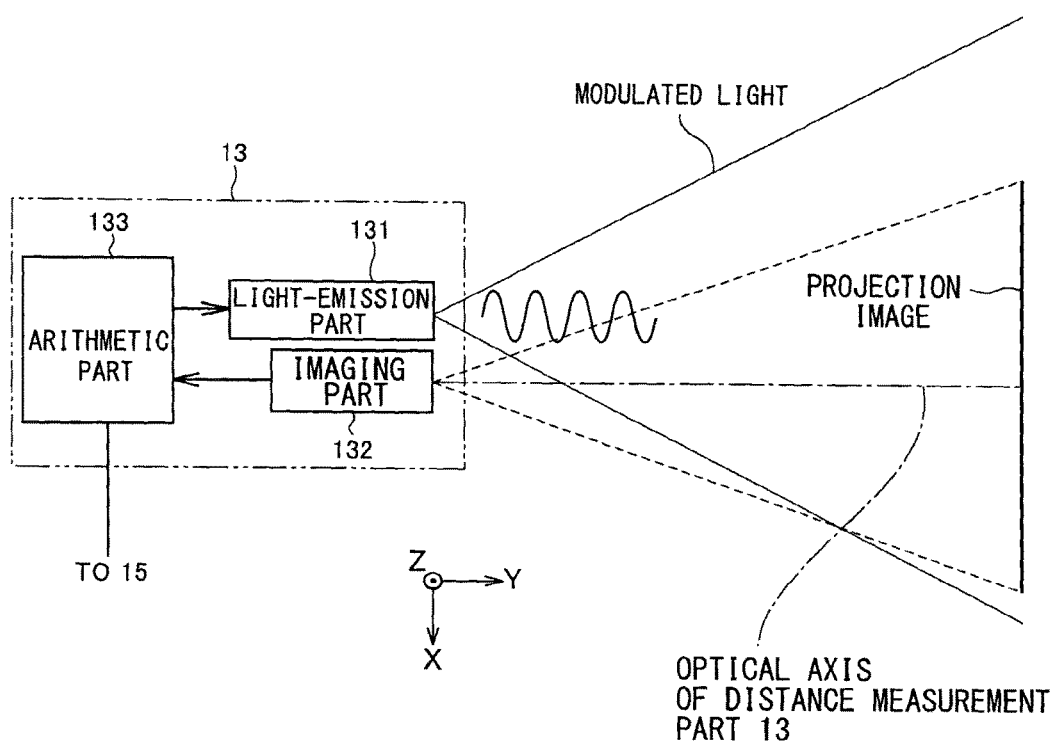
FIG. 35 is an explanatory view for explaining a second variation of the distance measurement parts.

In the above embodiment, the light-emission parts 131, 141 of the distance measurement parts 13, 14 may emit modulated light whose intensities are modulated and adjusted by predetermined frequencies, as illustrated in FIG. 35 (only the first distance measurement part 13 is illustrated). As is known, the irradiation region is larger than the projection image. Since the light emitted from the light-emission parts 131, 141 is near infrared light, the emission light do not disturb the user to see the projection image. The imaging parts 132, 142 capture an image of the structured light that has been reflected by the imaging target and whose phase has been shifted. Each of the arithmetic parts 133, 143 compares the light emitted from the corresponding light-emission part 131, 141 and the light imaged by the corresponding imaging part 132, 142 so as to acquire (calculated) the depth maps based on the time difference or the phase difference. Note this is so-called a Time-Of Flight (TOP) method.

Figure 36:
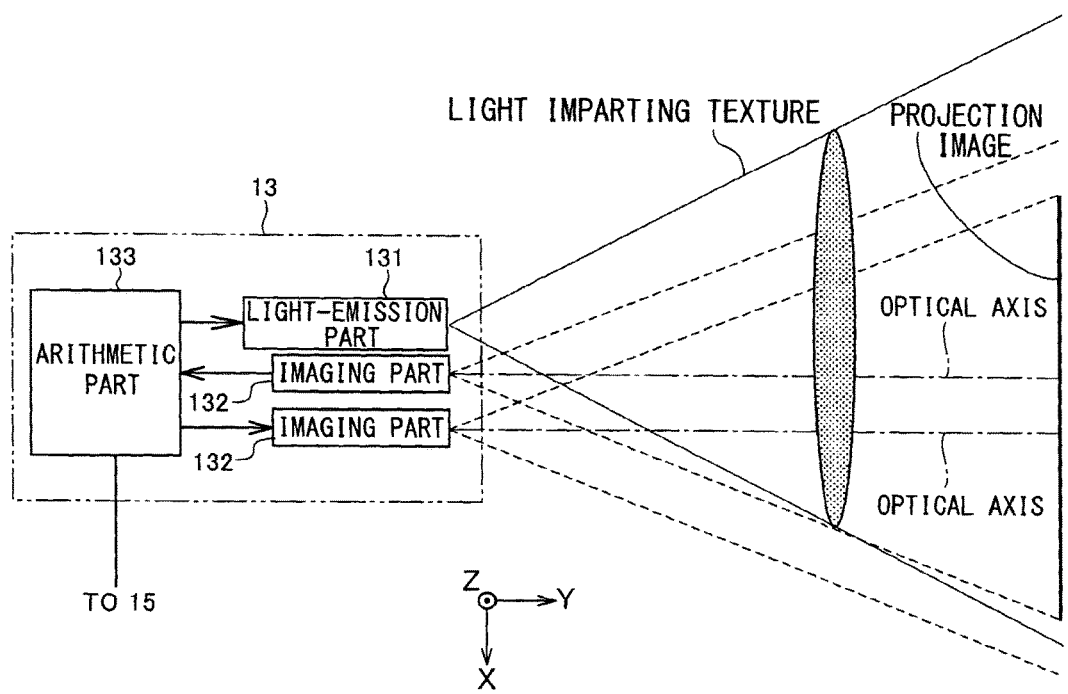
FIG. 36 is a first explanatory view for explaining a third variation of the distance measurement parts.
Figure 37:
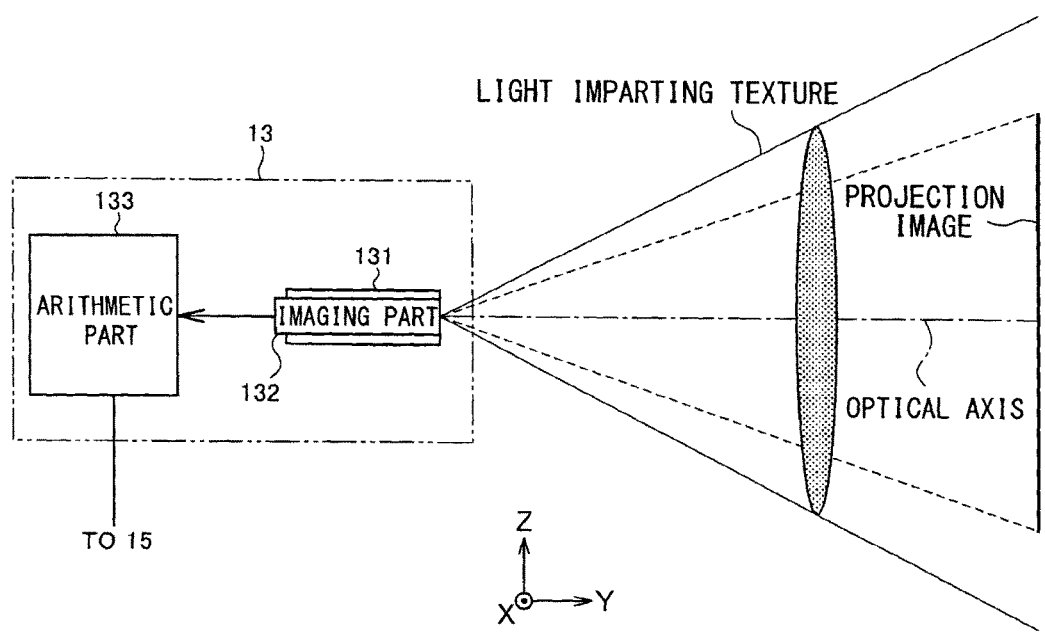
FIG. 37 is a second explanatory view for explaining the third variation of the distance measurement parts.

In the above embodiment, each of the light-emission parts 131, 141 of the distance measurement parts 13, 14 may emit light to impart texture onto the imaging target, as illustrated in FIG. 36 (only the first distance measurement part 13 is illustrated). As is known, the irradiation region is larger than the projection image. Since the light emitted from the light-emission parts 131, 141 is near infrared light, the emission light do not disturb the user to see the projection image. In this configuration, each of the distance measurement parts 13, 14 includes two imaging parts 132, 132, 142, 142 that capture images of the texture patterns projected onto the imaging target. That is, the first imaging part 132 and the second imaging part 142 respectively have two optical axes. The arithmetic parts 133, 143 calculate the depth maps based on the parallax of the images captured by the corresponding two imaging parts. To be specific, the arithmetic parts 133, 143 execute a process called stereo-parallelization onto each image and convert the images by assuming the optical axes of each distance measurement part to be in parallel. Therefore, the optical axes of each imaging parts 132, 142 do not have to be disposed in parallel. Note this is so-called a stereo method. The optical axes after the stereo-parallelization process are overlapped when viewed from the X axis direction, as illustrated in FIG. 37, thereby corresponding to the optical axis of the above described embodiment.

Figure 38:
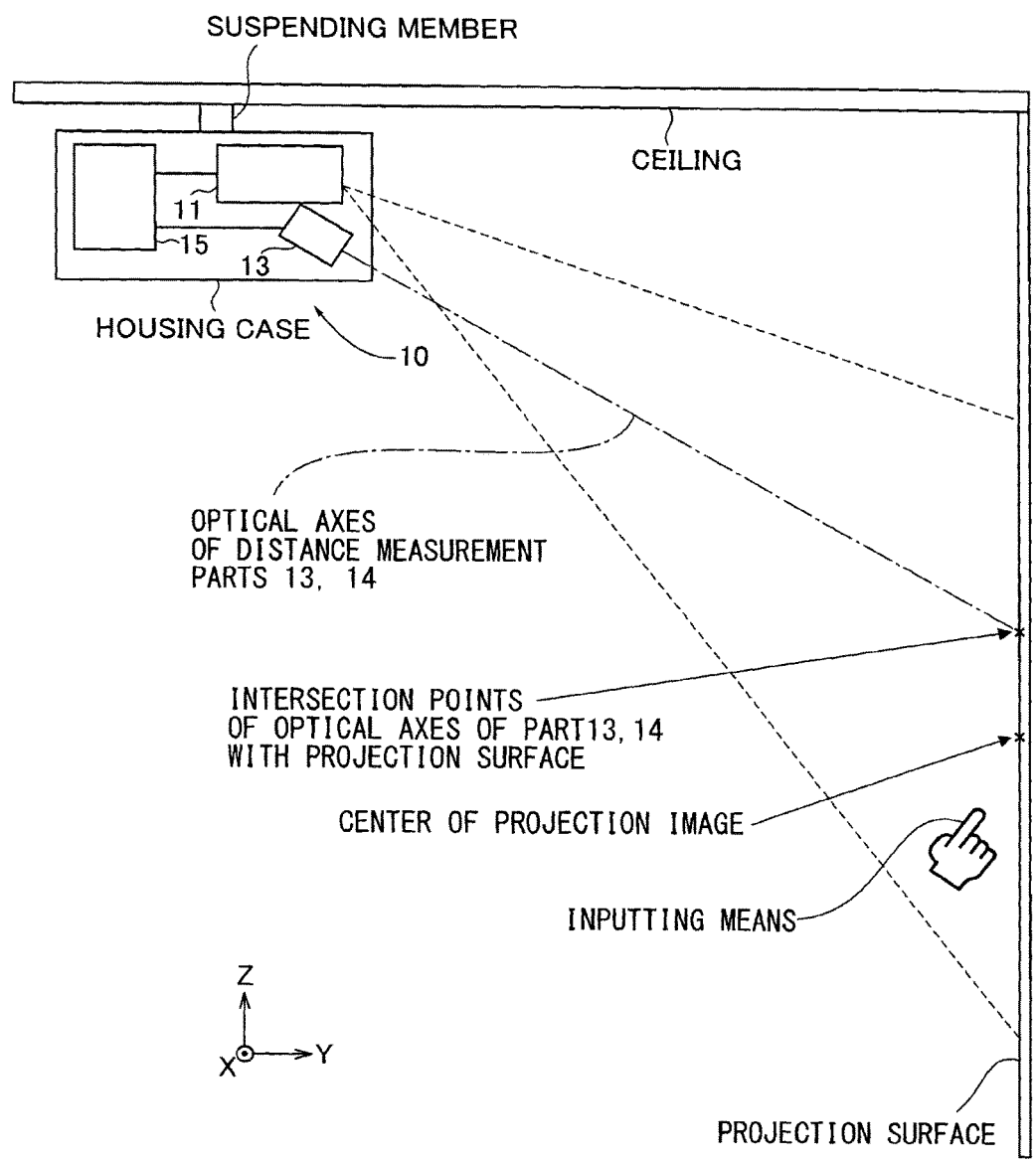
FIG. 38 is an explanatory view for explaining a third variation of the projection apparatus.

In the above embodiment, the projection apparatus 10 is exemplarily placed on the pedestal 400. However, it should not be limited thereto. For instance, the projection apparatus 10 may be suspended from a ceiling, as illustrated in FIG. 38. In such a case, the projection apparatus 10 is fixed to the ceiling via a suspending member.

The input operation detection device including the two distance measurement parts 13, 14 and the processor 15 can be applied to an interactive whiteboard or a digital signage. Either case, it can project desired images without increasing the costs.

Figure 39:
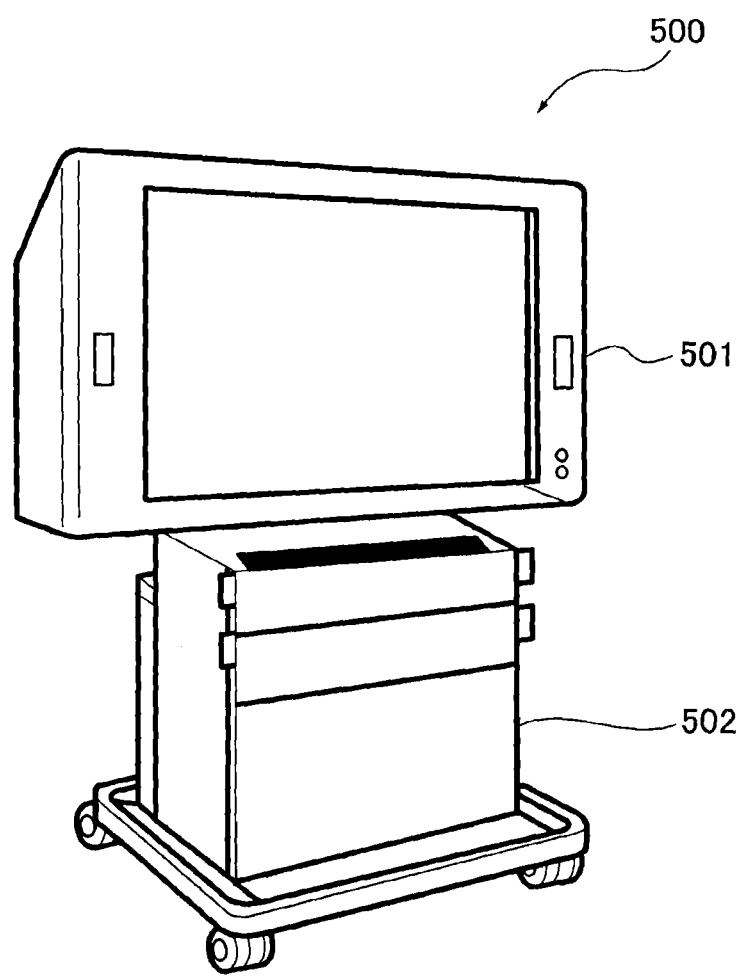
FIG. 39 is an explanatory view for explaining an example of an interactive whiteboard.

FIG. 39 illustrates an example of the interactive whiteboard. The interactive whiteboard 500 includes a panel part 501 installed with a panel to display menus, commands, executed results, or the like and an input unit to input the coordinate values; a storage to store a controller and a projection unit; a stand to support the panel part 501 and the storage at a specific height; and a device storage 502 to store a computer, scanner, a printer, a video player, and the like (see JP 2002-278700 A). The input operation detection device is stored in the device storage 502. By pulling out the device storage 502, the input operation detection device appears. The input operation detection device then detects input operations to the projection image input by the user. Communication between the controller and the input operation detection device may be achieved by wired communication such as a USB cable or by wireless communication.

Figure 40:
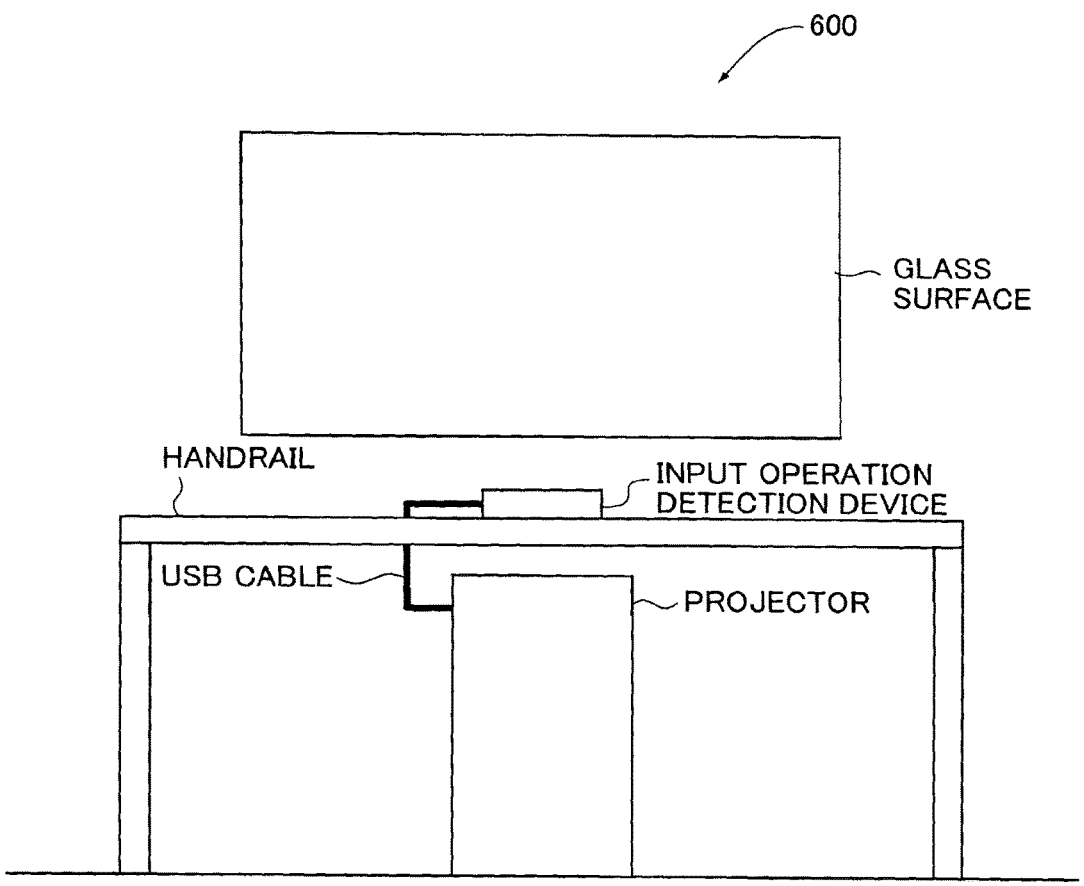
FIG. 40 is an explanatory view for explaining an example of a digital signage.

FIG. 40 illustrates an example of the digital signage. The digital signage 600 includes a glass surface as the projection surface. The images are projected by a projector from the rear side of the projection surface. The input operation detection device is installed on a handrail. Communication between the projector and the input operation detection device is achieved by a wired communication using a USB cable. Accordingly, the digital signage 600 can achieve an interactive function.

As described above, the input operation detection device including the two distance measurement parts 13, 14 and the processor 15 can be applied to a device having the interactive function or a device into which the interactive function can be added.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An input operation detection device configured to detect an input operation input to an image, displayed on a surface, by a user, comprising:
    a first imaging section that includes a first imaging optical system and a first image sensor;
    a second imaging section that includes a second imaging optical system and a second image sensor; and
    a processor configured to detect the input operation based on projection data acquired by the first imaging section and the second imaging section, wherein
    the image displayed on the surface is divided into a first image and a second image with respect to a first direction,
    the first imaging section is configured to capture the first image and the second imaging section is configured to capture the second image,
    an optical axis of the first imaging optical system intersects with the image at an intersection point on a same side as an installation position side of the first imaging section with respect to a center of the first image in the first direction, and
    an optical axis of the second imaging optical system intersects with the image at an intersection point on a same side as an installation position side of the second imaging section with respect to a center of the second image in the first direction.

2. The device according to claim 1, wherein the projection data acquired by the first and second imaging sections includes a depth map.

3. The device according to claim 1, wherein the intersection points are determined such that centers of rectangles circumscribing the corresponding first and second images match with centers of the corresponding first and second image sensors, respectively.

4. The device according to claim 1, wherein positions of the first and second image sensors with respect to the corresponding first and second imaging optical systems are determined such that centers of rectangles circumscribing the corresponding first and second images match with centers of the corresponding first and second image sensors, respectively.

5. The device according to claim 1, wherein the first and second imaging sections are disposed in a vicinity of a plane that is orthogonal to the first direction and includes the centers of the corresponding first and second images.

6. The device according to claim 1, wherein
    the first and second imaging sections include a first and second light-emission sources,
    the first light-emission source emits detection light toward the intersection point of the optical axis of the first imaging optical system with the image, and
    the second light-emission source emits detection light toward the intersection point of the optical axis of the second imaging optical system with the image.

7. The device according to claim 6, wherein the first and second light-emission sources emit structured light.

8. The device according to claim 6, wherein the first and second light-emission sources emit modulated light.

9. The device according to claim 6, wherein the first and second light-emission sources emit light to impart texture onto an imaging target.

10. A projection apparatus, comprising:
    a projector configured to project a projection image onto a projection surface as the displayed image; and
    the input operation detection device according to claim 1, which is configured to detect the input operation of the user input to the image projected on the projection surface.

11. The projection apparatus according to claim 10, wherein the input operation detection device is detachably provided to a housing case accommodating the projector.

12. The projection device according to claim 10, wherein the input operation detection device is installed in a housing case accommodating the projector.

13. An interactive whiteboard, comprising:
    the input operation detection device according to claim 1.

14. A digital signage, comprising:
    the input operation detection device according to claim 1.

15. A projection system, comprising:
    a projection apparatus according to claim 10; and
    a controller that is configured to control the image based on the input operation detected by the input operation detection device of the projection apparatus.

16. The input operation detection device of claim 1, wherein the processor is configured to detect the input operation of the user by analyzing the projection data, which is acquired by the first and second image sensors.

* * * * *